United States Patent [19]

Iwamatsu

[11] Patent Number: 5,479,204
[45] Date of Patent: Dec. 26, 1995

[54] NEGATIVE-IMAGE SIGNAL PROCESSING APPARATUS

[75] Inventor: Satoshi Iwamatsu, Tokyo, Japan

[73] Assignee: Fuji Photo Film Co., Ltd., Kanagawa, Japan

[21] Appl. No.: 267,763

[22] Filed: Jul. 5, 1994

Related U.S. Application Data

[63] Continuation of Ser. No. 746,365, Aug. 16, 1991, abandoned.

[30] Foreign Application Priority Data

| Aug. 28, 1990 | [JP] | Japan | 2-224364 |
| Aug. 28, 1990 | [JP] | Japan | 2-224365 |
| Aug. 28, 1990 | [JP] | Japan | 2-224366 |
| Sep. 21, 1990 | [JP] | Japan | 2-250077 |

[51] Int. Cl.$^6$ .................................................. H04N 9/64
[52] U.S. Cl. .............................. 348/96; 348/97; 348/255; 348/223
[58] Field of Search ........................ 348/655, 674, 348/689, 254, 255, 256, 96, 97, 104, 109, 111, 112, 223, 229, 645

[56] References Cited

U.S. PATENT DOCUMENTS 4,608,595  8/1986  Nakayama ........................ 358/29 C

*Primary Examiner*—Curtis Kuntz
*Assistant Examiner*—Minsun Oh

[57] ABSTRACT

The white peak level and black peak level of each of three types of color signals R, G and B obtained by picking up a negative image are detected. The amplitudes and levels of the signals are adjusted in such a manner that the white peak levels of the color signals R, G and B coincide as well as the black peak levels of these color signals. Signals representing the detected white peak and black peak levels are superimposed in first-half and second-half portions of a blanking interval of each of the color signals R, G and B. The signals that result can be utilized in subsequent signal processing. Also, the input/output characteristics of a gamma correction circuit are represented by an exponential function, which is for a gamma correction, up to a fixed input range, and by a KNEE curve, whose slope is smaller than that of the exponential curve, in a range beyond the fixed input range. Variable-gain amplifier circuits are provided in the front and in the back of the gamma correction circuit, and the range of the input/output characteristic curve used in the gamma correction circuit is adjusted. As a result, video signals having a variety of tone characteristics may be processed and in addition, it is possible to realize a variable gamma for obtaining tone characteristics suited to personal preferences.

10 Claims, 12 Drawing Sheets

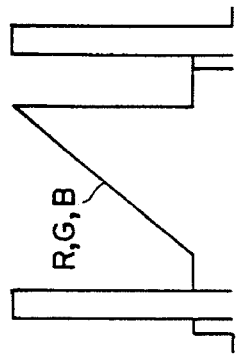
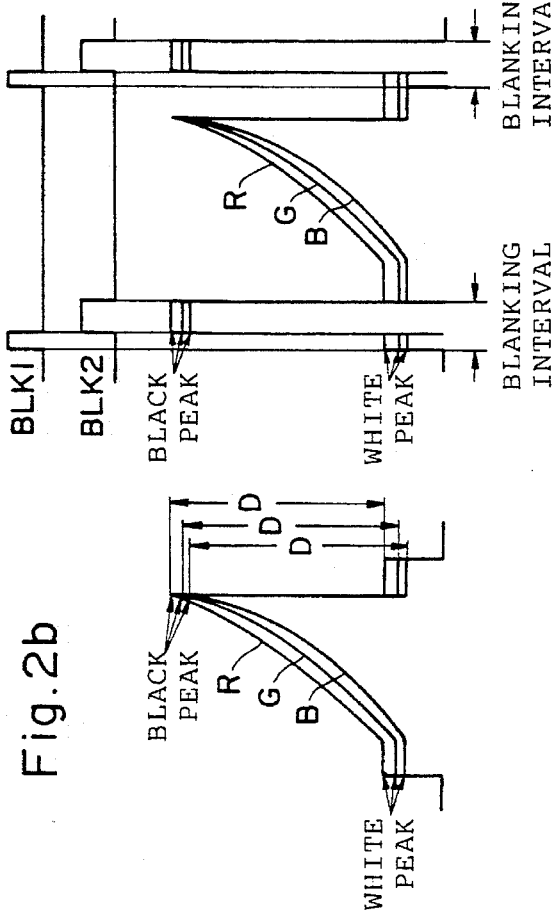
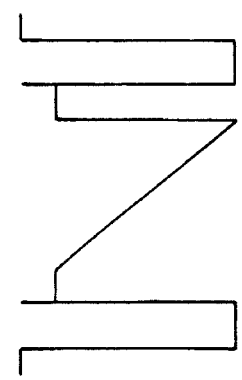
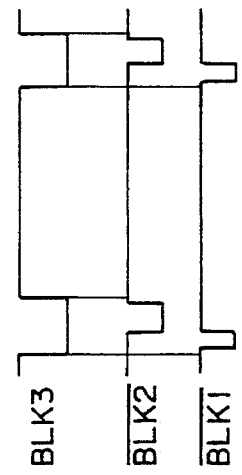
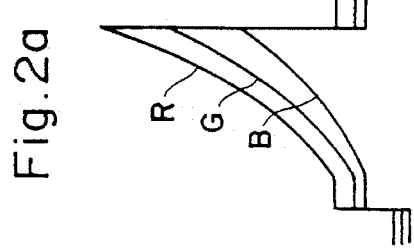
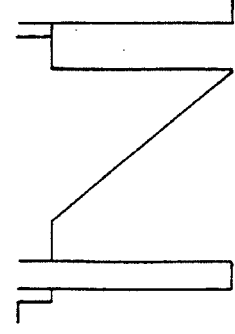

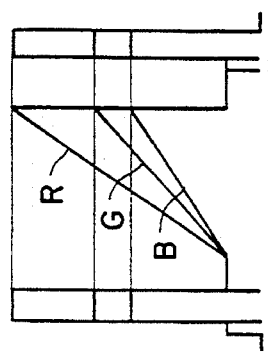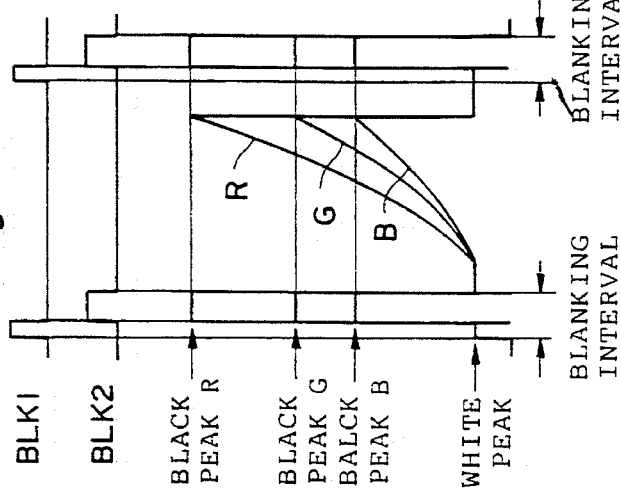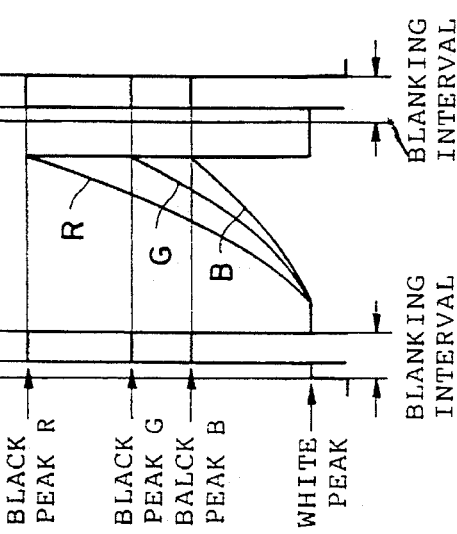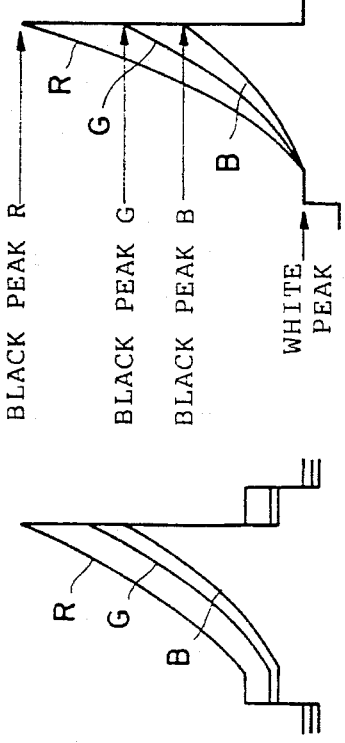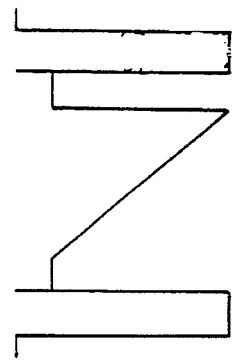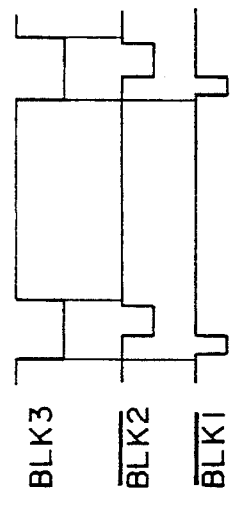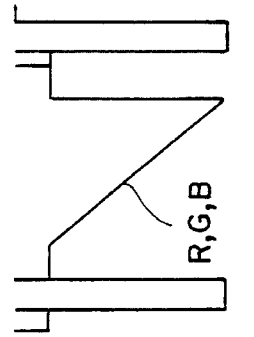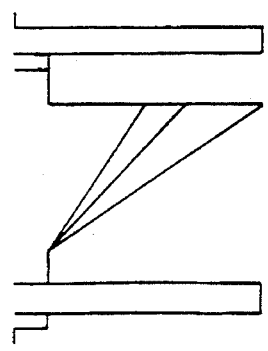

NEGATIVE-IMAGE SIGNAL PROCESSING APPARATUS

This application is a continuation, of application Ser. No. 07/746,365 filed on Aug. 16, 1991, now abandoned.

BACKGROUND OF THE INVENTION

1. Field of the Invention

This invention relates to a negative-image signal processing circuit and, more particularly, to a processing circuit for a white-balance adjustment.

The invention further relates to a variable-gamma correction circuit and an image signal processing circuit which uses the gamma correction circuit, especially an image signal processing circuit for a white-balance adjustment and gamma correction.

Further, the invention concerns a peak detector circuit for detecting the maximum or minimum level (peak level) of an input voltage. The peak detector circuit is well-suited for use in the above-mentioned negative-image signal processing circuit.

Still further, the invention relates to an electronic image pick-up apparatus having an electronic shutter function and, more particularly, to an apparatus well suited for picking up a planar negative image.

The variable-gamma correction circuit according to the present invention is applicable not only to a color image (signal) but also to monochrome image (signal). The image signal processing circuit according to a the invention is applicable not only to a negative image (signal) but also to a positive image (signal). However, since the image processing circuit is particularly effective for processing a negative image (signal), its application in this specification will be described mainly in connection with a negative image (signal).

2. Description of the Related Art

Negative-image pick-up is necessary in a system of the type in which an image that appears on a negative film is sensed and either displayed on a large-size display screen or projected on a screen in the form of a negative image or upon being converted to a positive image. This is a new system which has appeared on the scene as a replacement for the optical overhead projector and finds use in various meetings, lectures, etc. Since a video signal obtained by picking up a negative image has characteristics different from those of a video signal obtained by picking up a positive image, the video signal cannot be handled in the same manner.

FIG. 11 illustrates an example of tone characteristics (alogarithmic representation) of a negative film. Specifically, FIG. 11 shows the relationship between incident light quantity when a negative film is sensitized, and the development density of the negative film after it has been developed. Density is lowest at a portion A where the film has not been sensitized at all (a portion where light has been completely shut out) and highest at a portion B that has been sensitized completely. The luminance range of the sensed image is not the range from portion A to portion B but rather the luminace range of the sensed image is the range from the darkest portion to the brightest portion of the sensed image, as indicated by the usable range C in FIG. 11. Accordingly, the darkest portion of the sensed image must be the black level of the video signal, and the brightest portion of the sensed image must be the white level of the video signal. This means that it is necessary to detect the upper and lower limits of the usable range C.

In a case where the negative image is a color image, the color-tone characteristics of the three primary colors R, G and B which constitute this color differ from one another, as illustrated in FIG. 12. Moreover, the used ranges (indicated by the bold lines) of these color-tone characteristics also differ from one another. This is a significant problem. When color-tone characteristics differ depending upon the color, the half-tones of the reproduced image become colored. When the used ranges differ, color balance cannot be achieved. This problem arises also with regard to the complementary colors of yellow, magenta and cyan.

FIG. 13 illustrates a negative-image signal processing circuit according to the prior art. An image pick-up apparatus 70 such as a camera (a video camera or a still-video camera, etc.) produces color signals G, R and B representing the three primary colors. The color signals R and B are applied to variable-gain amplifier circuits 85, 86, respectively, which perform a white-balance adjustment by a well-known method. In a case where a negative image is sensed, an adjustment is carried out by the white-balance adjustment in such a manner that the peak levels of the negative-image signal (which level is referred to as a "black peak level"), namely the black peak levels obtained when a reversal is made from negative to positive, agree for the three primary-color signals G, R and B.

The color signals G, R and B obtained as a result of the white-balance adjustment are applied to gamma correction circuits 91, 93, 95, respectively, and to inverter circuits 71, 73, 75, respectively, where the signals are inverted from negative-image signals to positive-image signals. The resulting positive-image signals are applied to respective blanking mixer circuits 72, 74, 76 which superimpose a blanking signal BLK on these signals during their blanking intervals. The resulting signals are applied to gamma correction circuits 92, 94, 96, respectively. The same gamma correction curve is set in each of the gamma correction circuits 91, 93, 95 of the positive-image system. Gamma correction curves are set in the gamma correction circuits 92, 94, 96 of the negative-image system in dependence upon the tone characteristics of G, R and B. The arrangement is such that the tone characteristics after the gamma correction will coincide with the three primary colors of G, R and B.

Changeover switches 101, 102, 103 are provided for respective ones of the color signals G, R, B. Each changeover switch is adapted to switch between the gamma-corrected color signal of the positive system and the gamma-corrected color signal of the negative system. The output color signals G, R and B from the respective changeover switches 101, 102 103 are applied to a matrix circuit 83, whereby the signals are converted into a luminance signal Y and color-difference signals R-Y, B-Y. These signals Y, R-Y and B-Y are converted into an NTSC-format video signal by an encoder 84, which delivers the video signal as an output signal.

In this circuit according to the prior art, gamma correction curves conforming to the tone characteristics of the respective colors are set in the gamma correction circuits 92, 94, 96 of the negative system, and the tone characteristics of the respective color signals following gamma correction are in agreement. As a result, the aforementioned problem of half-tone coloring does not arise.

However, in the white-balance adjustment, the gains of the variable-gain amplifier circuits 85 and 86 are merely adjusted in such a manner that only the black peak levels of the color signals G, R and B coincide. Consequently, in the processing for the reversal from negative to positive, the black peak levels in terms of a positive image coincide but the white peak levels for the positive image do not. The problem that results is an inappropriate white balance.

In the conventional circuitry described above, the three-types of gamma correction circuits 92, 94, 96 in which the different gamma correction curves have been set are required in order to bring the tone characteristics of the three primary colors G, R and B into line. The result is a complicated circuit arrangement.

In general, a variable-gamma correction circuit is useful in varying tone characteristics in line with the subject photographed and personal preference. In order to realize variable gamma characteristics, however, a circuit arrangement of considerable complexity is required. Providing a plurality of such variable-gamma correction circuits would result in a much more complicated circuit arrangement, A peak detector circuit is useful and widely employed in many electrical circuits and electrical devices. For example, in fields wherein video signals are handled, detecting the peak level of a video signal is important for the purpose of white-balance adjustment and monitoring signal levels.

FIG. 14 illustrates an example of a peak detector circuit according to the prior art. As shown in FIG. 14, an input voltage is clamped by a clamping circuit 113 in such a manner that the reference level thereof attains a predetermined level, after which the clamped signal is fed into an operational amplifier 112. The output of the operational amplifier 112 charges a holding capacitor 110 via a protecting resistor 115 and diode 111. The maximum level of the input voltage is thus held by the capacitor 110. A switching circuit 114 for resetting purposes is connected across the holding capacitor 110.

In the conventional peak detector circuit of this kind, a diode 111 for preventing reverse current is connected between the operational amplifier 112 and the holding capacitor 110. As a result, the voltage held by the capacitor 110 attains a value lower than the maximum voltage of the input voltage by an amount equivalent to the forward voltage $V_F$ (ordinarily several hundred millivolts) of diode 111. Thus, an error, which corresponds to the foward voltage $V_F$ is produced. Moreover, since the forward voltage VF varies by several hundred millivolts depending upon temperature, highly accurate peak detection cannot be achieved.

SUMMARY OF THE INVENTION

Accordingly, an object of the present invention is to provide a processing circuit capable of realizing appropriate white balance of negative-image color signals.

Another object of the present invention is to provide a variable-gamma correction circuit capable of being constructed with a comparative amount of simplicity.

Still another object of the present invention is to provide a variable-gamma correction circuit whereby the tone characteristics of a plurality of color signals can be made to conform in appropriate fashion or can be adjusted as desired.

A further object of the present invention is to provide an image signal processing circuit whereby the tone characteristics of a plurality of color signals can be made to conform or can be adjusted as desired and appropriate white balance can be realized.

A further object of the present invention is to provide a peak detector circuit capable of realizing highly accurate peak detection.

Yet another object of the present invention is to perform a suitable exposure adjustment in an image pick-up device which performs gamma corrections separately by using the aforementioned variable gamma correction circuits in such a manner that the tone characteristics of three color signals are eventually brought into conformity, thereby making it possible to perform the gamma corrections appropriately.

According to the present invention, there is provided a negative-image signal processing circuit comprising a peak detector circuit for detecting a maximum level (black peak level) and a minimum level (white peak level) of each of three types of color signals obtained by picking up a negative image, and an adjusting circuit for adjusting the amplitudes and the maximum or minimum levels of the three types of colors signals in such a manner that the detected maximum levels become equal to one another in the three types of color signals and the detected minimum levels become equal to one another in the three types of color signals.

In accordance with this aspect of the present invention, the color signals are adjusted in such a manner that the maximum levels of the three types of color signals coincide with one another and the minimum levels of the three types of color signals coincide with one another. Accordingly, the black peak levels of the three color signals coincide with one another, and so do the white peak levels of the three color signals. Since the white and black peak levels are thus made to conform for the three types of color signals, a proper white-balance adjustment always can be achieved even if the color signals are left in the negative state or even if a negative to positive reversal is made.

By way of example, the adjusting circuit includes variable-gain amplifier circuits for adjusting the amplitudes of at least two types of the color signals in such a manner that the differences between detected maximum levels and minimum levels become equal to one another for the three types of color signals, and a level adjusting circuit for adjusting the levels of the three types of color signals so that these attain a level at which the maximum levels or minimum levels become equal to one another.

In a preferred embodiment, gamma correction circuits are provided for bringing the tone characteristics of the three types of color signals into conformity, these gamma correction circuits being equipped with the level adjusting circuits mentioned above.

In another preferred embodiment, clamping circuits for bringing the levels of DC components of the three types of color signals into conformity are provided for respective ones of the three types of color signals and are arranged in front of the peak detector circuit. As a result, reliable detection of the maximum and minimum levels becomes possible without influencing the DC signal components.

The negative-image signal processing circuit according to the invention further comprises blanking mixer circuits for superimposing signal components representing the detected maximum level and minimum level on first- and second-half portions, respectively, of blanking intervals of the three types of color signals adjusted in such a manner that differences between the maximum and minimum levels become equal to one another.

A signal component representing the black peak level and a signal component representing the white peak level are applied in the blanking interval, in which a signal component representing an image is not present, at different positions along the time axis. As a result, the signal component representing the image is not adversely affected by application of the aforementioned signal components. Moreover, the black and white peak levels are preserved within the color signals so that these signals can be used in subsequent signal processing.

According to the present invention, there is provided a variable-gamma correction circuit comprising a gamma correction circuit having input/output characteristics represented by an exponential curve for a gamma correction up to a fixed input range, and bey a KNEE curve having a smaller slope in a range beyond the fixed input range, and variable-gain amplifier circuits connected in front of and in back of the gamma correction circuit for adjusting the used range of the input/output characteristic curve in the gamma correction circuit.

By adjusting the gains of the variable-gain amplifier circuits, the used range of the input/output characteristic curve of the gamma correction circuit can be changed, thereby making it possible to change the gamma value (the exponent). Accordingly, any gamma correction curve can be obtained, thereby making it possible to obtain a desired tone characteristic. Moreover, the circuit arrangement is made comparatively simple since it suffices merely to provide the gamma correction circuit whose input/output characteristics possesses the KNEE curve in the range beyond the predetermined input range, and the variable-gain amplifier circuits.

Even though the above-described gamma correction circuit is applicable to both a color video signal and a monochromatic video signal, the invention is particularly effective when applied to a color video signal. The circuit arrangement in such a case will now be described.

Specifically, a variable-gamma correction circuit suited to a color video signal in accordance with the present invention comprises a gamma correction circuit to which are inputted three types of color signals obtained by imaging a subject, and which has an input/output characteristic represented by an exponential curve for a gamma correction up to a fixed input range, and by a KNEE curve having a smaller slope in a range beyond the fixed input range, and variable-gain amplifier circuits connected in front of and in back of the gamma correction circuit, and provided for at least two types of the three types of color signals, for adjusting, for every color signal, the used range of the input/output characteristic curve in the gamma correction circuit.

In accordance with the invention, merely providing the gamma correction circuit having the KNEE characteristics and at least two variable-gain amplifier circuits makes it possible to achieve conformity among the tone characteristics of the three types of color signals having tone characteristics that differ from one another. It is possible also to set these tone characteristics to any desired tone characteristics.

In accordance with the present invention, there is provided a signal processing circuit comprising a peak detector circuit for detecting a maximum level and a minimum level of each of three types of color signals obtained by imaging a subject; first variable-gain amplifier circuits for adjusting the magnitudes of at least two types of color signals of the three types of color signals in such a manner that differences between the detected maximum and minimum levels attain a predetermined ratio for the three types of color signals; a gamma correction circuit, which is connected in back of the first variable-gain amplifier circuits and to which the three types of color signals are inputted, and which has input/output characteristics represented by an exponential curve for a gamma correction up to a fixed input range, and by a KNEE curve having a smaller slope in a range beyond the fixed input range; and second variable-gain amplifier circuits connected in back of the gamma correction circuit, and provided for at least two types of the three types of color signals, for adjusting, for every corresponding color signal, a used range of the input/output characteristic curve in the gamma correction circuit in relation to the ratio of the three types of color signals.

In accordance with the image signal processing circuit according to the present invention, the tone characteristics of a plurality of color signals can be brought into conformity or adjusted at will. In addition, suitable white-balance adjustment of each of a plurality of color signals is possible.

In a preferred embodiment, an adjustment is performed by the second variable-gain amplifier circuits in such a manner that the differences between the maximum and minimum levels of the finally outputted three types of color signals become equal to one another with regard to the three types of color signals.

Thus, the differences between the maximum levels (the black peak levels in case of a negative image) and the minimum levels (the white peak levels in case of a negative image) of the three types of color signals agree with one another with regard to the three types of color signals. Accordingly, the white and black peak levels can be made to conform in the three types of color signals whenever necessary by a clamping processing or the like. As a result, a suitable white-balance adjustment can always be achieved.

In a preferred embodiment, clamping circuits for bringing the levels of DC components of the three types of color signals into conformity are provided for respective ones of the three types of color signals and are arranged in front of the peak detector circuit. As a result, reliable detection of the maximum and minimum levels becomes possible without influencing the DC signal components.

The signal processing circuit further comprises blanking mixer circuits for superimposing signal components representing the detected maximum level (black peak signal) and minimum level (white peak level) on first- and second-half portions, respectively, of blanking intervals of respective ones of the three types of color signals.

A signal component representing the black peak level and a signal component representing the white peak level are applied in the blanking interval, in which a signal component representing an image is not present, at different positions along the time axis. As a result, the signal component representing the image is not adversely affected by application of the aforementioned signal components. Moreover, the black and white peak levels are preserved within the color signals so that these signals can be used in subsequent signal processing.

In accordance with the present invention, there is provided an image signal processing circuit characterized by comprising first variable-gain amplifier circuits provided for at least two types of color signals for adjusting white balance of three types of color signals obtained by imaging a subject; a gamma correction circuit, which is connected in back of the first variable-gain amplifier circuits and to which the three types of color signals are inputted, and which has an input/output characteristics represented by exponential curve for a gamma correction up to a fixed input range, and by a KNEE curve having a smaller slope in a range beyond the fixed input range; and second variable-gain amplifier circuits connected in back of the gamma correction circuit, and provided for at least two types of the three types of color signals, for adjusting, for every corresponding color signal, a used range of the input/output characteristic curve in the gamma correction circuit, and for finely adjusting white balance of the color signals.

In accordance with the present invention, the tone characteristics of a plurality of color signals can be brought into conformity or adjusted at will. In addition, suitable white-balance adjustment of each of a plurality of color signals is possible.

In the present invention, the curves mentioned above are intended to cover the meaning of polygonal lines as well.

A peak detector circuit in accordance with the present invention comprises a holding capacitor for holding a peak voltage; a current source for charging the holding capacitor; and a comparator for comparing an input voltage and the voltage held by the holding capacitor, and executing control in dependence upon whether a peak to be detected is a maximum value or a minimum value in such a manner that if the held voltage has not attained the input voltage, the current source is activated to charge the holding capacitor.

According to the present invention, in a case where the voltage held by the holding capacitor has not attained the input voltage, this is detected by the comparator and the holding capacitor is charged by the current source until the held voltage becomes equal to the input voltage. Since the charging of the holding capacitor is performed by the current supplied from the current source controlled by the comparator, a diode for preventing a reverse current need not be provided between an input terminal and the holding capacitor, as is required in the prior art. As a result, an error arising from a voltage in the forward direction no longer is produced and accurate peak detection can be achieved. In addition, since a comparator generally operates at a high speed, peak detection can be performed more rapidly.

In order to arrange it so that both maximum and minimum levels of the input voltage may be detected, two of the above-described peak detector circuits are provided, one for detecting the maximum level and one for detecting the minimum level. Further, an input circuit is provided, which applies the input voltage directly to the peak detector circuit, for maximum-level detection, and the peak detector circuit for minimum-level detection is also provided with a voltage obtained by subtracting the input voltage from a predetermined reference voltage.

By virtue of such an arrangement, the upper and lower peak levels can be detected at the same time as the white and black peak levels of a video signal in the same manner.

An electronic image pick-up apparatus having an electronic shutter function according to the present invention comprises a solid-state electronic imaging device having an electronic shutter function; a driver circuit for controlling charge accumulating time of the solid-state electronic imaging device in dependence upon a given shutter speed, and reading out an accumulated signal charge at a predetermined period; a gamma correction circuit, to which are inputted three types of color signals obtained by processing a signal read out of the solid-state electronic imaging device, and which has input/output characteristics represented by a power-function curve for a gamma correction up to a fixed input range, and by a KNEE curve having a smaller slope in a range which exceeds the fixed input range (the curve includes polygonal lines); variable-gain amplifier circuits connected in front of and in back of the gamma correction circuit, and provided for at least two types of the three types of color signals, for adjusting, for every corresponding color signal, the used range of the input/output characteristic curve in the gamma correction circuit; a peak detector circuit for detecting a maximum level and a minimum level of each of the three types of color signals on an input side of the gamma correction. circuit; shutter-speed control means for deciding, with regard to a predetermined color signal, a shutter speed for obtaining an exposure at which a difference between the detected maximum and minimum levels attains a predetermined value (which may be a value within a predetermined range), and for controlling the driver circuit so as to operate at this shutter speed; first gain control means for controlling the gains of the variable-gain amplifier circuits, which are connected in front of the gamma correction circuit, in such a manner that with regard to the other two types of color signals of the three types of color signals, differences between detected maximum and minimum levels attain respective predetermined values (which may be values which correspond to the difference between the levels of the aforesaid predetermined color signal); and second gain control means for controlling thee gains of the variable-gain amplifier circuits, which are connected in back of the gamma correction circuit, in such a manner that the differences between the maximum and minimum levels become equal to one another in the three types of color signals after they have been gamma-corrected.

In accordance with the present invention, a proper exposure is obtained using an electronic shutter. By setting the exposure properly, it is possible to realize, in correct fashion, a function through which conformity is obtained among the tone characteristics of the three types of color signals using the gamma correction circuit having the aforementioned KNEE characteristics. As a result, a sensed image having a correct color balance can be obtained even if the image is a negative image such as found on a negative film. Since it is so arranged that the proper exposure is obtained using an electronic shutter, it is not necessary to provide an expensive auto iris mechanism. The image pick-up apparatus of the invention is capable of operation sufficiently without being provided with an iris at all. In a case where a planar subject is to be photographed and the distance to the subject has been decided, proper image pick-up is possible even if the iris is open (which includes the case in which there is no iris), i.e., even if the depth of field is small. It goes without saying that the present invention is applicable also to an electronic image pick-up apparatus equipped with an iris. The reason is that when a negative film or the like is imaged, the operator is instructed to fully open the iris and allow the exposure to be adjusted by the electronic shutter.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is waveform diagrams showing the input and output signals for each block in the circuit of FIG. 1;

FIG. 8 is waveform diagrams showing the input and output signals of each block in the circuit shown in FIG. 7;

DESCRIPTION OF THE PREFERRED EMBODIMENTS

Figure 1:
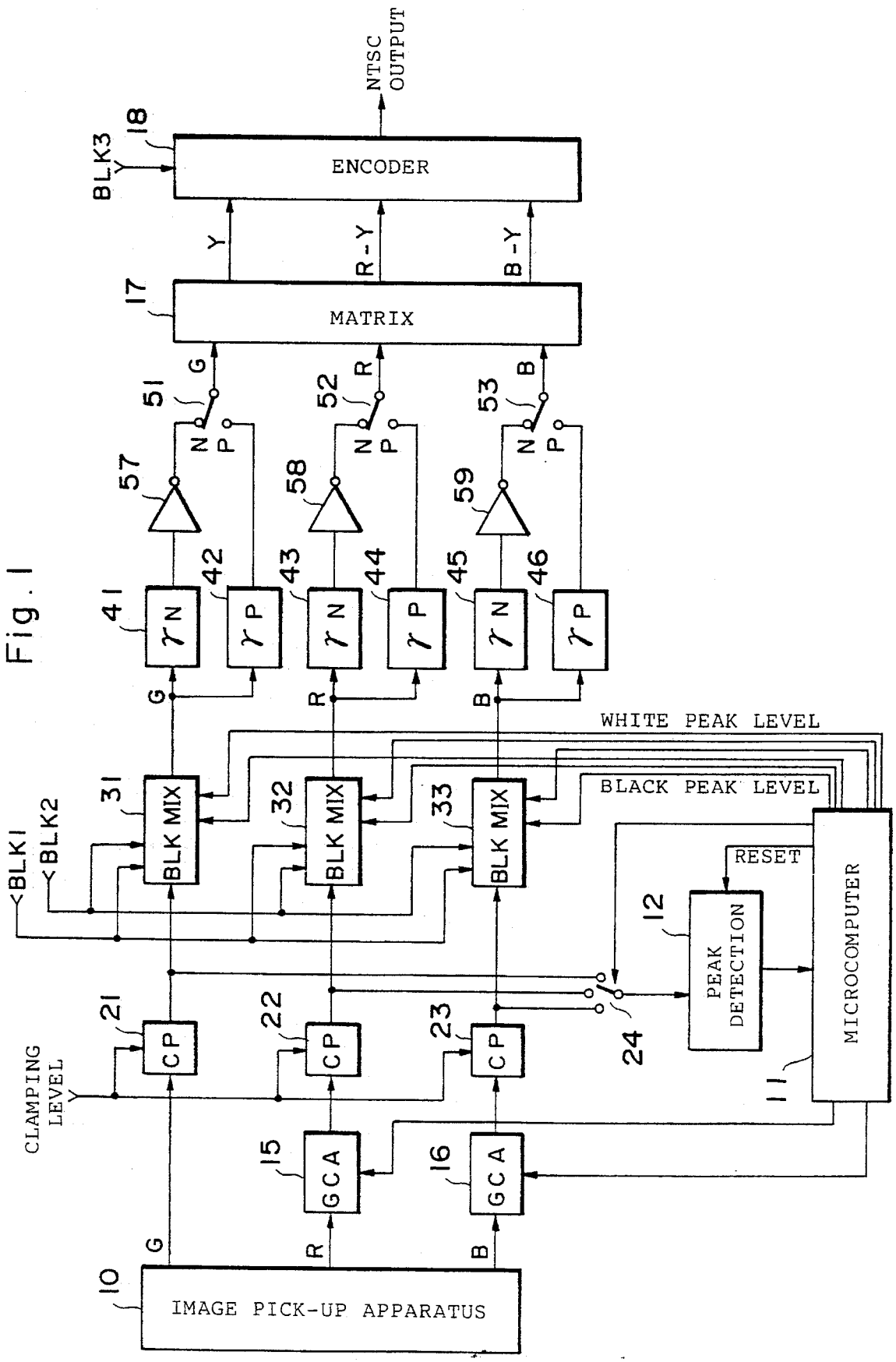
FIG. 1 is a block diagram illustrating an embodiment of a negative-image signal processing circuit according to an embodiment of the present invention.

FIG. 1 illustrates an embodiment of a circuit for processing a negative-image signal according to the present invention.

An image pick-up apparatus 10 such as a video camera or a still-video camera produces the three primary-color signals G, R and B representing the image of a subject. In a case where the image is at rest, such as the image on a negative film, the color signals representing the image on the negative film are repeatedly outputted at a fixed period (e.g., 1/60 sec). The color signals G, R, B outputted by the image pick-up apparatus 10 are as shown in FIG. 2a. As illustrated, the color signals G, R, B reflect the differences in the tone characteristics of the colors, as described earlier. Also, levels of the DC signal components generally differ from one another.

The color signal G from among these color signals is applied directly to a clamping circuit 21, and the other color signals R and B are applied to respective clamping circuits 22, 23 upon first being amplified at an appropriate gain (less than one in some cases), described below, by variable-gain amplifier circuits 15 and 16, respectively. The same clamping level is set in the clamping circuits 21, 22 and 23. The DC signal components of the color signals G, R and B are made to conform by the clamping circuits 21, 22 and 23.

The color signals G, R and B outputted by the respective clamping circuits 21, 22 and 23 are applied to respective blanking circuits 31, 32 and 33 and also to a changeover switch (multiplexer) 24. The changeover switch 24 is changed over at a fixed time interval by a microcomputer 11 so that the color signals G, R and B are successively applied to a peak detector circuit 12.

As will be described in detail later, the peak detector circuit 12 detects the maximum level and minimum level of the input signal applied thereto. In a case where the color signals G, R and B represent a negative image such as that on a negative film, the maximum level corresponds to the black peak level and the minimum level corresponds to the white peak level, and therefore the terms "black peak level" and "white peak level" will be used hereinafter. When the color signal G is being applied to the peak detector circuit 12 by the changeover switch 24, the peak detector detects the black and white peak levels of the color signal G. The time during which the changeover switch 24 is selecting the color signal G preferably is an interval during which an appropriate region of one frame is scanned. This is equivalent to setting a window on the frame and performing white and black peak detection within the window. The description for the color signal G applies to the other color signals R and B as well. The microcomputer 11 applies a reset pulse to the peak detector circuit 12. This reset pulse is outputted every vertical blanking interval, by way of example.

The detected black and white peak levels of each of the color signals G, R and B are applied to the microcomputer 11. The latter uses the data representing the inputted black and white peak levels to perform a white-balance adjustment by controlling the gains of the variable-gain amplifier circuits 15, 16 so as to establish equality among the difference between the black peak level and white peak level of the color signal G; the difference between the black peak level and white peak level of the color signal R; and the difference between the black peak level and white peak level of the color signal B (these differences are indicated by D in, FIG. 2b). The color signals G, R and B after thus being white-balance adjusted and having their DC components clamped are as shown in FIG. 2b. The black peak levels of the three color signals G, R and B still do not coincide, and neither do the white peak levels of these signals. In addition, the disparity among the tone characteristics of the color signals G, R and B has not yet been adjusted.

The white-balance adjusted color signals G, R and B are respectively applied to blanking mixer circuits 31, 32 and 33, as described earlier. Two types of blanking-timing signals BLK1, BLK2 are inputted to each of the blanking mixer circuits 31, 32 and 33. The blanking-timing signal BLK1 is a signal that attains the H level in the first half of the blanking interval, and the blanking-timing signal BLK2 is a signal that attains the H level in the second half of the blanking interval. The microcomputer 11 supplies the blanking mixer circuit 31 with signals representing the detected black peak level and white peak level of the color signal G; the blanking mixer circuit 32 with signals representing the detected black peak level and white peak level of the color signal R; and the blanking mixer circuit 33 with signals representing the detected black peak level and white peak level of the color signal B. The blanking mixer circuits 31, 32 and 33 superimpose pulse signals representing the corresponding white peak levels on the color signals G, R and B during the time that the blanking-timing signal BLK1 is at the H level, and superimpose pulse signals representing the corresponding black peak levels on the color signals G, R and B during the time that the blanking-timing signal BLK2 is at the H level.

The color signals G, R and B obtained by applying the pulse signals representing the white and black peak levels in the blanking intervals are illustrated, along with the blanking-timing signals BLK1, BLK2, in FIG. 2c. Since the white and black peak levels are preserved in the blanking intervals of the color signals G, R and B, these white and black peak levels can be utilized in later circuitry. For example, after the color signals are inverted from negative to positive, the black peak levels may be used as the black reference level of a video signal. The white peak levels are used for the sake of clamp processing in a gamma correction, as will be described below.

The outputs or the blanking mixer circuits 31, 32 and 33 are applied to respective negative-image gamma correction circuits 41, 43 and 45 and also to respective positive-image gamma correction circuits 42, 44 and 46. Gamma correction curves conforming to the tone characteristics of the color signals G, R and B are set in the negative-image gamma correction circuits 41, 43 and 45, respectively. In the negative-image gamma correction circuits 41, 43 and 45, the respective input signals (the color signals G, R and B) are clamped in such a manner that their white peak levels will coincide by attaining a prescribed level, and the input signals are respectively gamma-corrected in accordance with the gamma correction curves in such a manner that the tone characteristics after the gamma correction will coincide for the three primary colors G, R and B. The output color signals G, R and B of the negative-image gamma correction circuits 41, 43 and 45 are as shown in FIG. 2d. As will be appreciated from FIG. 2d, the color signals G, R and B are such that their black peak levels agree with one another, their white peak levels agree with one another and their tone characteristics are in conformity with one another.

The output signals from the negative-image gamma correction circuits 41, 43 and 45 are inverted from negative to positive by inverter circuits 57, 58 and 59, respectively. The signals after inversion are as shown in FIG. 2e.

The same gamma correction curve is set in each of the positive-image gamma correction circuits 42, 44 and 46. Of course, different gamma correction curves may be set in these positive-image gamma correction circuits 42, 44 and 46 if desired.

The outputs of the gamma correction circuits 41 and 42 are inputted to a changeover switch 51, the outputs of the gamma correction circuits 43 and 44 to a changeover switch 52, and the outputs of the gamma correction circuits 45 and 46 to a changeover switch 53.

The changeover switches 51, 52 and 53 are provided for respective ones of the color signals G, R and B and each changeover switch is for switching between the gamma-corrected color signal of the positive system and the gamma-corrected color signal of the negative system. It is preferable, of course, that the changeover switches 51, 52 and 53 be operatively associated with one another. The output color signals G, R and B of these changeover switches 51, 52 and 53 are applied to a matrix circuit 17, which converts them into a luminance signal Y and color-difference signals R-Y and B-Y. These signals Y, R-Y and B-Y are converted into an NTSC-format video signal by an encoder 18, which delivers the video signal as an output signal.

A blanking-timing signal BLK3 is applied to the encoder 18. As shown in FIG. 2f, the blanking-timing signal BLK3 is a pulsed signal which represents the blanking intervals (during which interval the signal is at the L level) and has a pulse width slightly larger than the combined pulse widths of the timing signals BLK1 and BLK2. Blanking is performed in the L-level interval of the timing signal BLK3 in such a manner that the signals Y, R-Y and B-Y coincide with the respective signal levels (i. e., the black levels) in the H-level interval of the timing signal BLK2. As a result, a signal component representing the blanking interval of the NTSC format is applied to the signals Y, R-Y and B-Y. The NTSC signal finally obtained is as illustrated in FIG. 2g.

An embodiment of the peak detector circuit according to the present invention will now be described in detail.

Figure 3:
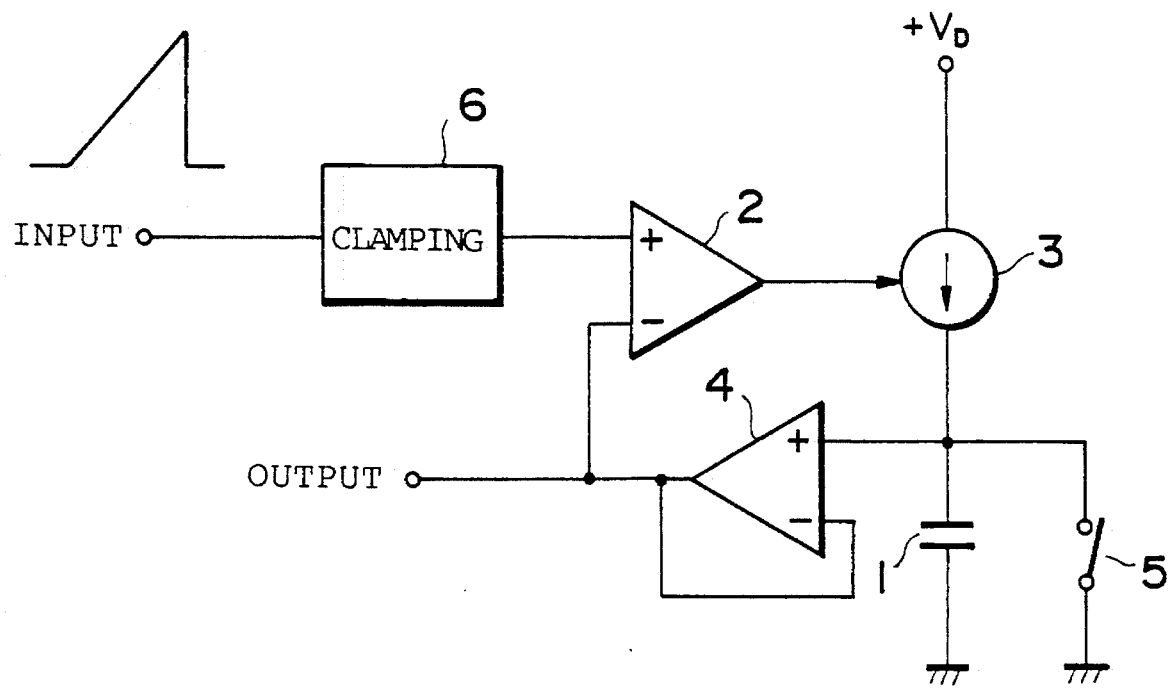
FIG. 3 is a circuit diagram showing the principle of a peak detector circuit according to an embodiment of the present invention.

FIG. 3 is for describing the principle of the peak detector circuit of the present embodiment.

A holding capacitor 1 is charged by a current supplied by a current source 3. The voltage held by the holding capacitor 1 is outputted, and applied to the negative input terminal of a comparator 2, via a buffer circuit 4. An input voltage is clamped by a clamping circuit 6 in such a manner that the reference voltage thereof attains a predetermined level, after which the voltage is applied to the positive input terminal of the comparator 2. When the input voltage is greater than the voltage held by the holding capacitor 1, the comparator 2 places the current source 3 in the active state to further charge the holding capacitor 1. When the voltage held by the holding capacitor 1 becomes equal to the input voltage due to the charging of the holding capacitor 1, the current source 3 ceases the supply of the current. When the input voltage is less than the held voltage, the current source 3 is in the deactivated state and no current is delivered. Due to the buffer circuit 4, the charge in the holding capacitor 1 is held for a prolonged period of time. Thus, the voltage held by the holding capacitor 1 represents the maximum value of the input voltage. A switching circuit 5 for resetting purposes is connected across the holding holding capacitor 1. The capacitor 1 is discharged only when the switching circuit 5 turns on.

Figure 4:
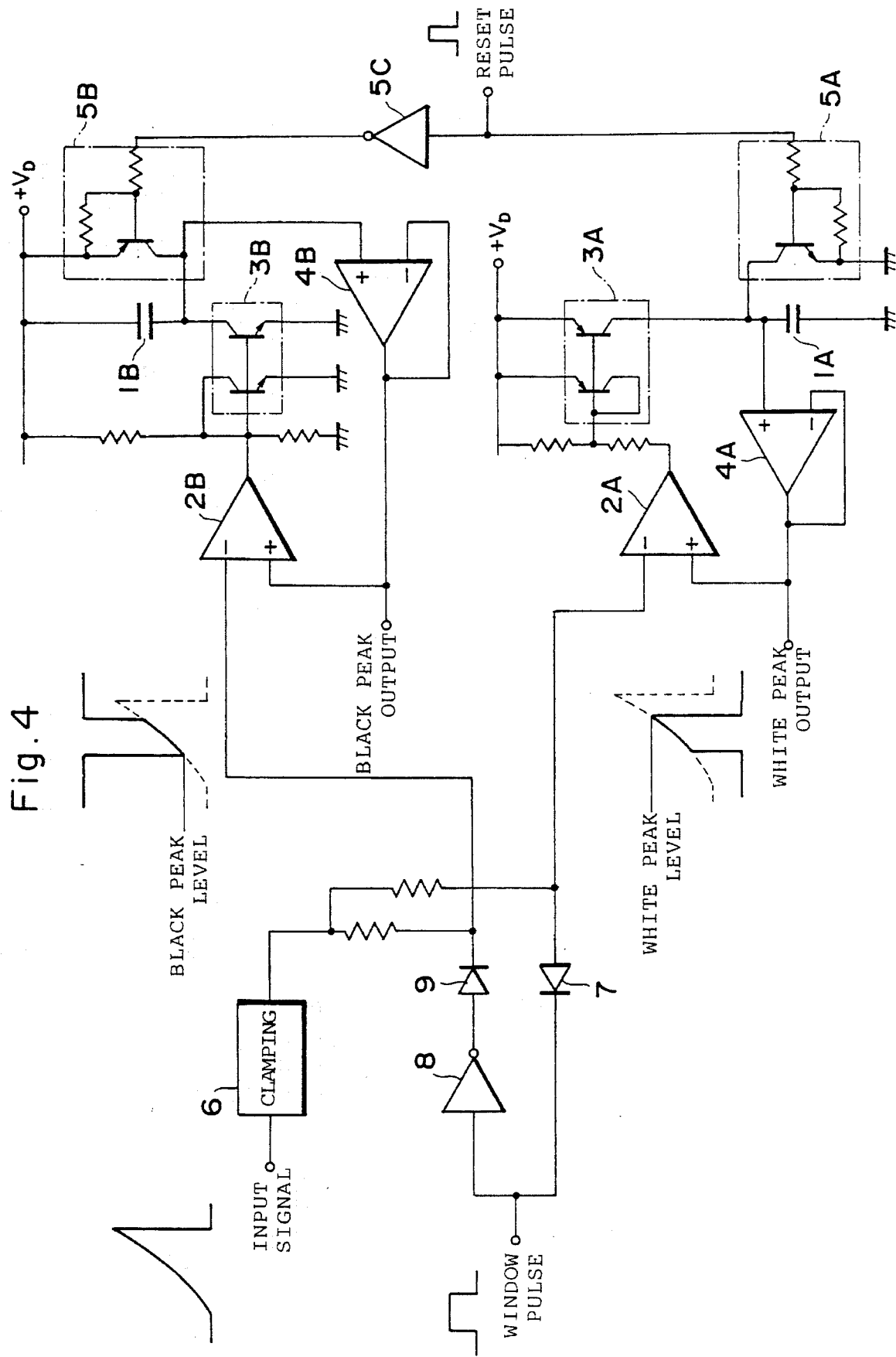
FIG. 4 is a circuit diagram showing a circuit for detecting white peak levels and this and black peak level, circuit illustrates an embodiment of a peak detector circuit according to the present invention.

FIG. 4 illustrates an embodiment in which the peak detector circuit according to the invention is applied in order to detect the white and black peak levels of a video signal. As shown in FIG. 4, two of the peak detector circuits illustrated in FIG. 3 are provided, one for white peak detection and one for black peak detection. In FIG. 4, circuit elements identical with those shown in FIG. 3 are designated by like reference numerals with suffixes A or B attached. The suffix A is assigned to circuitry for white peak detection and the suffix B to circuitry for black peak detection. The reference level of the circuitry for white peak detection is the zero level, and that of the circuitry for black peak detection is the power-supply voltage $V_D$.

The input-voltage video signal is applied to the negative input terminal of each of comparators 2A, 2B via the clamping circuit 6, and the outputs of buffer circuits 4A, 4B are applied to the positive input terminals of the comparators 2A, 2B, respectively. In FIG. 4, the input signals to the positive and negative input terminals of the comparators 2A, 2B are the reverse of the input signals applied to the positive and negative input terminals of the comparator shown in FIG. 3. The comparators 2A, 2B are of an open-collector type.

In this embodiment, a window is set in a predetermined portion of the input video signal, and the white and black peak levels are detected within the window. The window pulse, which represents the set window, is applied on one hand to the negative input terminal of the white-peak detection comparator 2A via a reversely connected diode 7. Accordingly, the input video signal is applied intact to the negative input terminal of the comparator 2A only when the window pulse is at the H level. When the window pulse is at the L level, the input video signal flows through the diode 7 and falls to the zero level. The window pulse is applied on the other hand to the negative input terminal of the black-peak detection comparator 2B via a forwardly connected diode 9 upon being inverted by an inverter circuit 8. Accordingly, when the window pulse is at the L level, this window pulse is inverted to the H level and then applied to the comparator 2B via the diode 9. When the window pulse is at the H level, this window pulse is inverted to the L level and is therefore blocked by the diode 9. As a result, the input video signal is applied directly to the negative input terminal of the comparator 2B. Accordingly, the input video signal is applied to the comparator 2B as a waveform voltage identically to obtaining the video signal by subtracting the video signal from the H level of the inverter circuit 8.

Current sources 3A, 3B are each constituted by a current mirror (the types of transistors constituting the current mirrors differ). These current mirrors are controlled by the comparators 2A, 2B. More specifically, in the circuitry for detecting white peak level, the current mirror constructing the current source 3A is turned on only when the output of the comparator 2A is at the L level (i.e., only when the input at the negative input terminal of the comparator 2A is greater than the input at the positive input terminal thereof), and therefore the holding capacitor 1A is charged. In the circuitry for detecting black peak level, the current mirror constructing the current source 3B is turned on only when the output of the comparator 2B is at the H level, and therefore the holding capacitor 1B is charged. Thus, the voltage held by the holding capacitor 1A becomes equal to the white peak=level, and the voltage held by the capacitor 1B becomes equal to the black peak level. As a result, the buffer circuit 4A delivers the output voltage which represents the detected white peak level, and the buffer circuit 4B delivers the output voltage which represents the detected black peak level.

The switching circuits 5A, 5B for reset are each constituted by a switching transistor. A reset pulse is applied to the switching circuit 5A directly and to the switching circuit 5B upon being inverted by an inverter circuit 5C. The reason for this is that the transistors constructing the switching circuits 5A and 5B are of different types (npn or pnp). When the reset pulse is applied, the switching circuits 5A and 5B are turned on so that the electric charge that has accumulated in the holding capacitors 1A and 1B is discharged.

The peak detector circuit 12 shown in FIG. 1 is realized by the circuitry shown in FIG. 4. In such a case, the clamping circuits 21, 22 and 23 illustrated in FIG. 1 correspond to the clamping circuit 6 of FIG. 4. Further, in the circuit of FIG. 4, the white and black peak levels are considered on the premise that the image is a positive image, and therefore the white and black peak levels in the circuit of FIG. 4 are the reverse of the levels in the circuit of FIG. 1. Furthermore, the diodes 7, 9 and the inverter circuit 8 shown in FIG. 4 can be considered to construct part of the changeover switch 24. The window pulse corresponds to the changeover-control pulse of the changeover switch 24. The reset pulse applied to the reset switching circuits 5A, 5B corresponds to the reset pulse outputted by the microcomputer 11 in FIG. 1.

An embodiment of a variable-gamma correction circuit and of an image signal processing circuit using this correction circuit according to the present invention will now be described.

Figure 5:
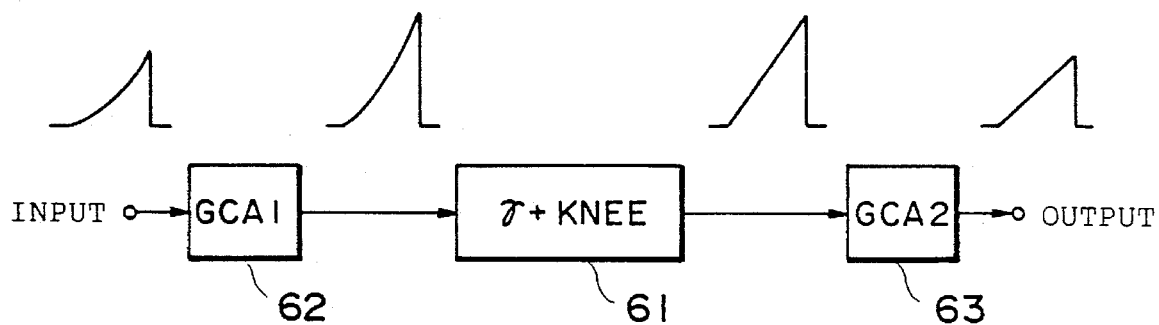
FIG. 5 is a block diagram illustrating an embodiment of a variable-gamma correction circuit.

FIG. 5 illustrates an embodiment of a variable-gamma correction circuit according to the present invention. In FIG. 5, typical input and output waveforms are shown in the front and back of each block.

The variable-gamma correction circuit includes a first variable-gain amplifier circuit 62 on the input side, a gamma correction circuit 61 having a KNEE characteristic, and a second a variable-gain amplifier circuit 63 on the output side.

Figure 6A:
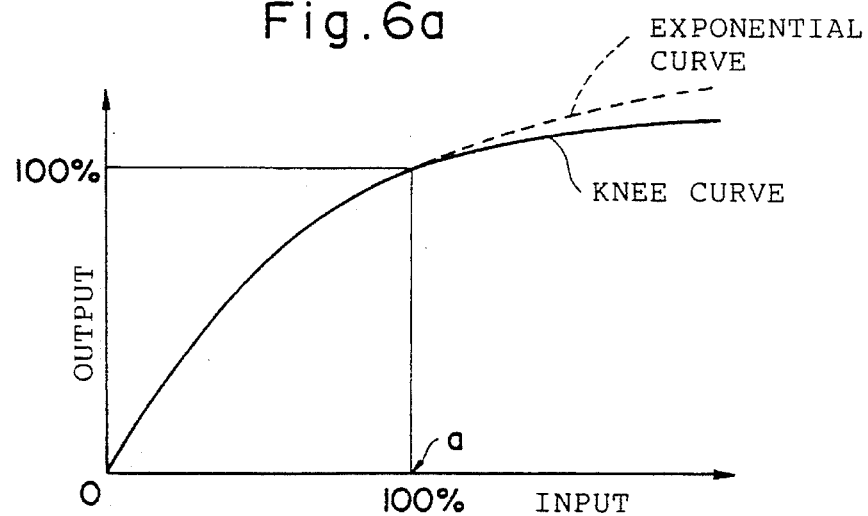
FIG. 6 is graphs showing input/output characteristics for describing the function of the variable-gamma correction circuit.

An example of the input/output characteristics the gamma correction circuit 61 is illustrated in FIG. 6a. The solid line in FIG. 6a represents the input/output characteristics of the gamma correction circuit 61. For the sake of simplicity, it will be assumed that the gain of each of the first and second variable-gain amplifier circuits 62, 63 is 1. The curve indicated by the solid line over an input range of 0–100% (point a) is a exponential curve. When the input is 100%, the output is 100%. In general, a CRT display device has light-emitting characteristics of the power 2.2, and therefore the gamma value often is selected to be 0.45. It goes without saying, however, that the gamma value is not limited to this value. In particular, another appropriate value is selected when imaging a negative film. In the range beyond an input of 100%, the above-mentioned exponential curve is indicated by the dashed line; the solid line indicates a KNEE curve. The KNEE curve is set to have a slope smaller than that of the exponential curve. This can be realized by successively turning on parallel-connected diodes, to which mutually different biases are applied, as the input voltage increases, and thereby successively reducing the ratio of an increase in the output to an increase in the input.

Figure 6B:
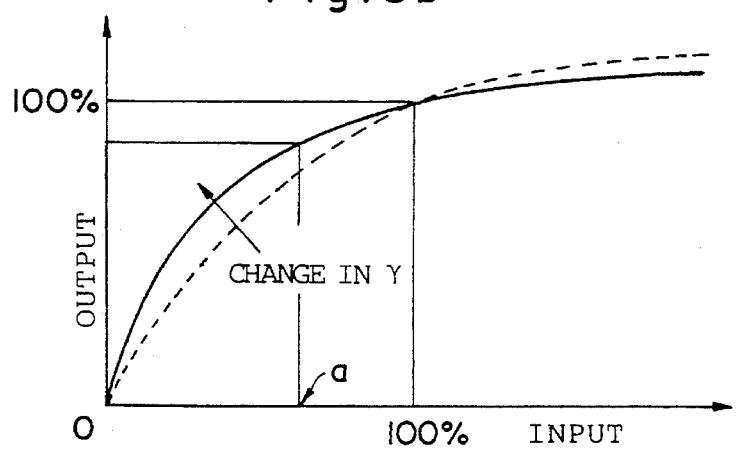

When the gain of the first variable-gain amplifier circuit 62 on the input side is made greater than 1, there is an apparent increase in the input to the gamma correction circuit 61; hence, the range over which the input signal varies exceeds 100% and a transition is made to the region of the KNEE curve. By making the gain of the second variable-gain amplifier circuit 63 on the output side smaller than 1, the output of the second variable-gain amplifier circuit 63 enters the 100% range. This is equivalent to shortening, in relative terms, the horizontal and vertical axes in the graph of FIG. 6a. The solid line in FIG. 6b illustrates the input/output characteristics for a case where the gain of the first variable-gain amplifier circuit 62 on the input side is made larger than 1 and the gain of the second variable-gain amplifier circuit 63 on the output side is made smaller than 1. This is equivalent to changing the gamma correction curve from the dashed line (the input/output characteristics shown in FIG. 6a) to the solid line in apparent terms. The gamma value can be changed by thus adjusting the gains of the first and second variable-gain amplifier circuits 62, 63.

Figure 7:
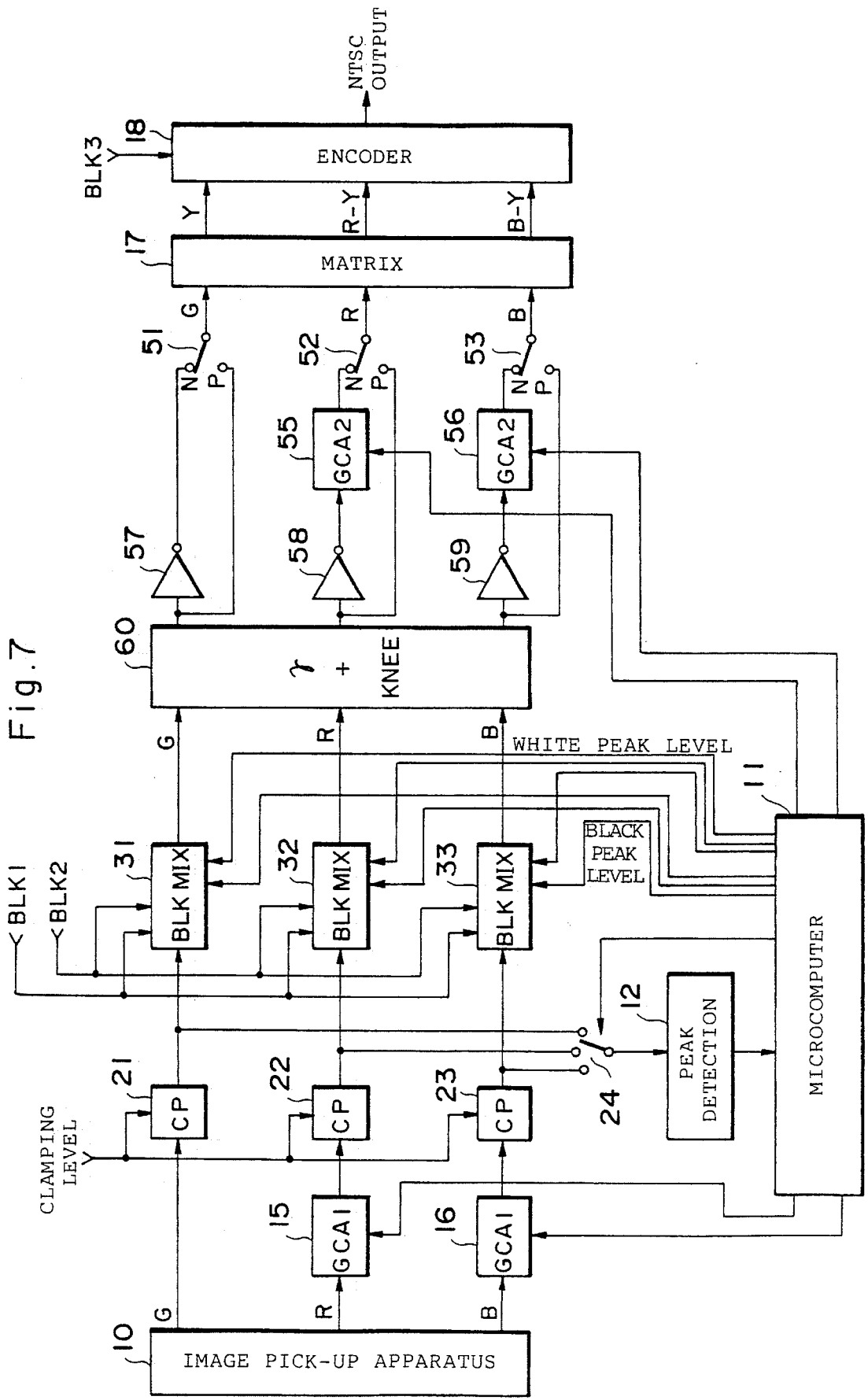
FIG. 7 is a block diagram showing an embodiment of an image signal processing circuit.

FIG. 7 illustrates an image signal processing circuit, especially portions relating to white-balance adjustment and gamma correction, in accordance with an embodiment of the present invention, Circuit blocks in FIG. 7 that are identical with those shown in FIG. 1 are designated by like reference characters. Even though the microcomputer 11 is the same as that in FIG. 1, the control method implemented thereby is different.

The image pick-up apparatus 10, such as a video camera, or a still-video camera produces the three primary-color signals G, R and B representing the image of a subject. These color signals G, R, B are as shown in FIG. 8a. As illustrated, the color signals G, R, B reflect the differences in the tone characteristics of the colors, as described earlier. Also, the levels of the DC signal components generally differ from one another.

The color signal G from among these color signals is applied directly to the clamping circuit 21, and the other color signals R and B are applied to the respective clamping circuits 22, 23 upon first being amplified at an appropriate gain, as will be described below, by the variable-gain amplifier circuits 15 and 16. respectively. The same clamping level is set in the clamping circuits 21, 22 and 23. The DC signal components of the color signals G, R and B are made to conform by the clamping circuits 21, 22 and 23.

The color signals G, R and B outputted by the respective clamping circuits 21, 22 and 23 are applied to respective blanking mixer circuits 31, 32 and 33 and also to a changeover switch (multiplexer) 24. The changeover switch 24 is changed over at a fixed time interval by a microcomputer 11 so that the color signals G, R and B are successively applied to the peak detector circuit 12.

When the color signal G is being applied to the peak detector circuit 12 by the changeover switch 24, the peak detector detects the black and white peak levels of the color signal G. The description for the color signal G applies to the other color signals R and B as well.

The detected black and white peak levels of each of the color signals G, R and B are applied to the microcomputer 11. The latter uses the data representing the inputted black and white peak levels to perform a provisional white-balance adjustment by controlling the gains of the variable-gain amplifier circuits 15, 16 so as to establish a fixed ratio among the difference between the black peak level and white peak level of the color signal G; the difference between the black peak level and white peak level of the color signal R; and the difference between the black peak level and white peak level of the color signal B. The color signals G, R and B after thus being provisionally white-balance adjusted and having their DC components clamped are as shown in FIG. 8b. The levels of the DC components of the three color signals G, R, B conform. The black peak levels or the white peak levels of the three color signals G, R and B still do not coincide. In addition, the disparity among the tone characteristics of the color signals G, R and B has not yet been adjusted. Even though the white peaks are drawn as so as to coincide with one another for the color signals G, R and B in FIG. 8b, this is done in order to simplify the drawing.

The provisionally white-balance adjusted color signals G, R and B are respectively applied to the blanking mixer circuits 31, 32 and 33, as described earlier. The two types of blanking-timing signals BLK1, BLK2 are inputted to each of the blanking mixer circuits 31, 32 and 33. The blanking-timing signal BLK1 is a signal that attains the H level in the first half of the blanking interval, and the blanking-timing signal BLK2 is a signal that attains the H level in the second half of the blanking interval. The microcomputer 11 supplies each of the blanking mixer circuits 31, 32 and 33 with signals representing the black peak levels and white peak levels, which have been adjusted to the fixed ratio, of the color signals G, R and B. The blanking mixer circuits 31, 32 and 33 superimpose pulse signals representing the white peak levels on the color signals G, R and B during the time that the blanking-timing signal BLK1 is at the H level, and superimpose pulse signals representing the corresponding black peak levels on the color signals G, R and B during the time that the blanking-timing signal BLK2 is at the H level.

The color signals G, R and B obtained by thus applying the pulse signals representing the white and black peak levels in the blanking intervals are illustrated, along with the blanking-timing signals BLK1, BLK2, in FIG. 8c. Since the white and black peak levels are preserved in the blanking intervals of the color signals G, R and B, these white and black peak levels can be utilized in later circuitry. For example, after the color signals are inverted from negative to positive, the black peak levels may be used as the black reference level of a video signal. The white peak levels are used in clamp processing for bringing these peak levels into conformity with a fixed level.

The outputs of the blanking mixer circuits 31, 32 and 33 are applied to a gamma correction circuit 60 having a KNEE characteristic. The gamma correction circuit 60 has a gamma correction circuit (i.e., a circuit possessing the same input/output characteristics), which is identical with the gamma correction circuit 61 (FIG. 5), for each of the color signals G, R and B. The color signals G, R and B inputted to the gamma correction circuit 60 are outputted upon being gamma-corrected, in dependence upon their input magnitudes (the aforementioned ratio), by the input/output characteristic curve and a portion of which is the KNEE curve. The height (amplitude) of the pulse signal representing the black peak level applied in the blanking interval also is gamma-corrected in the same manner. The output signal of the gamma correction circuit 60 is as shown in FIG. 8d.

The output signals G, R and B from the gamma correction circuit 60 are inverted from negative to positive by the inverter circuits 57, 58 and 59, respectively (the signals after inversion are as shown in FIG. 8e). The output signals G, R and B from the gamma correction circuit 60 are also connected to the positive terminals P of the changeover switches 51, 52, 53, respectively.

Among the color signals inverted by the by the inverter circuits 57, 58 and 59, the signals R and B are applied to variable-gain amplifier circuits 55 and 56, respectively. As shown in FIG. 8f, the gains of the variable-gain amplifier circuits 55 and 56 are adjusted (i.e., the white-balance adjustment thereof is completed) in such a manner that the tone characteristics of the output signals R, B of the amplifier circuits 55, 56 and of the output signal G from inverter circuit 57 coincide, and such that the differences between the black and white peak levels coincide in the three color signals G, R and B. In other words, the ratio of the differences between the black and white peak levels in the above-described provision for white-balance adjustment are suitably set in such a manner that the tone characteristics of the three primary colors G, R, B, as well as the differences between the black and white peak levels of these colors, are brought into coincidence by the gamma correction circuit 60 having the KNEE characteristic and the variable-gain amplifier circuits 55, 56. If necessary, the black peak levels or white peak levels in the three color signals G, R and B are made to conform by a clamping processing or the like in the encoder 18, etc., as will be described later. The signals G, R and B for which the tone characteristics and the differences between the black peak levels and white peak levels (i.e., for which white balance has been completely adjusted) are applied to the negative input terminals N of the changeover switches 51, 52 and 53, respectively.

The changeover switches 51, 52 and 53 are provided for respective ones of the color signals G, R and B and each changeover switch is for switching between the gamma-corrected color signal of the positive system and the gamma-corrected color signal of the negative system. The output color signals G, R and B of these changeover switches 51, 52 and 53 are applied to the matrix circuit 17, which converts them into a luminance signal Y and color-difference signals R-Y and B-Y. These signals Y, R-Y and B-Y are converted into an NTSC-format video signal by the encoder 18, which delivers the video signal as an output signal.

The blanking-timing signal BLK3 is applied to the encoder 18. As shown in FIG. 8g, the blanking-timing signal BLK3 is a pulsed signal which represents the blanking interval (during which interval the signal is at the L level) and has a pulse width slightly larger than the combined pulse widths of the timing signals BLK1 and BLK2. Blanking is performed in the L-level interval of the timing signal BLK3 in such a manner that the signals Y, R-Y and B-Y coincide with the respective signal levels (i.e., the black levels) in the H-level interval of the timing signal BLK2. As a result, a signal component representing the blanking interval of the NTSC format is applied to the signals Y, R-Y and B-Y. The NTSC signal finally obtained is as illustrated in FIG. 8h.

An arrangement may be adopted in which a complete white-balance adjustment is performed by bringing the differences between the white peak levels and black peak levels into agreement in the three primary color signals G, R and B by the variable-gain amplifier circuits 15 and 16. In such a case, the variable-gain amplifier circuits 55 and 56 would perform a gamma correction only. Even though already adjusted white balance may be shifted somewhat by this gamma correction, problems fail to be encountered in many cases.

Further, it is permissible to adopt an arrangement in which the gains of the variable-gain amplifier circuits 55 and 56 are adjusted manually. In such a case it would be possible to realize a fine manual adjustment of at least one of white balance and gamma correction.

Figure 12:
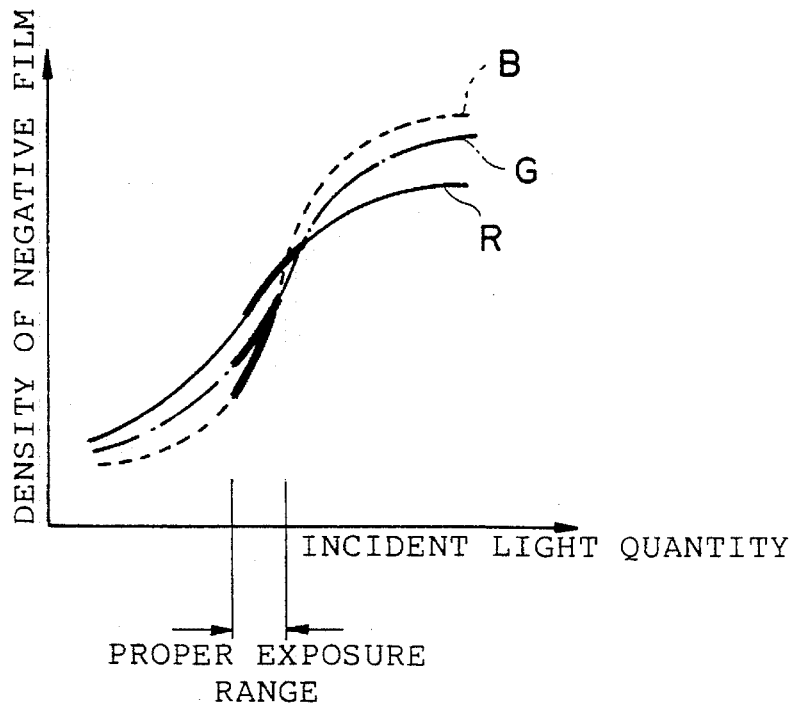
FIG. 12 is a graph showing how tone characteristics differ depending upon color.
Figure 13:
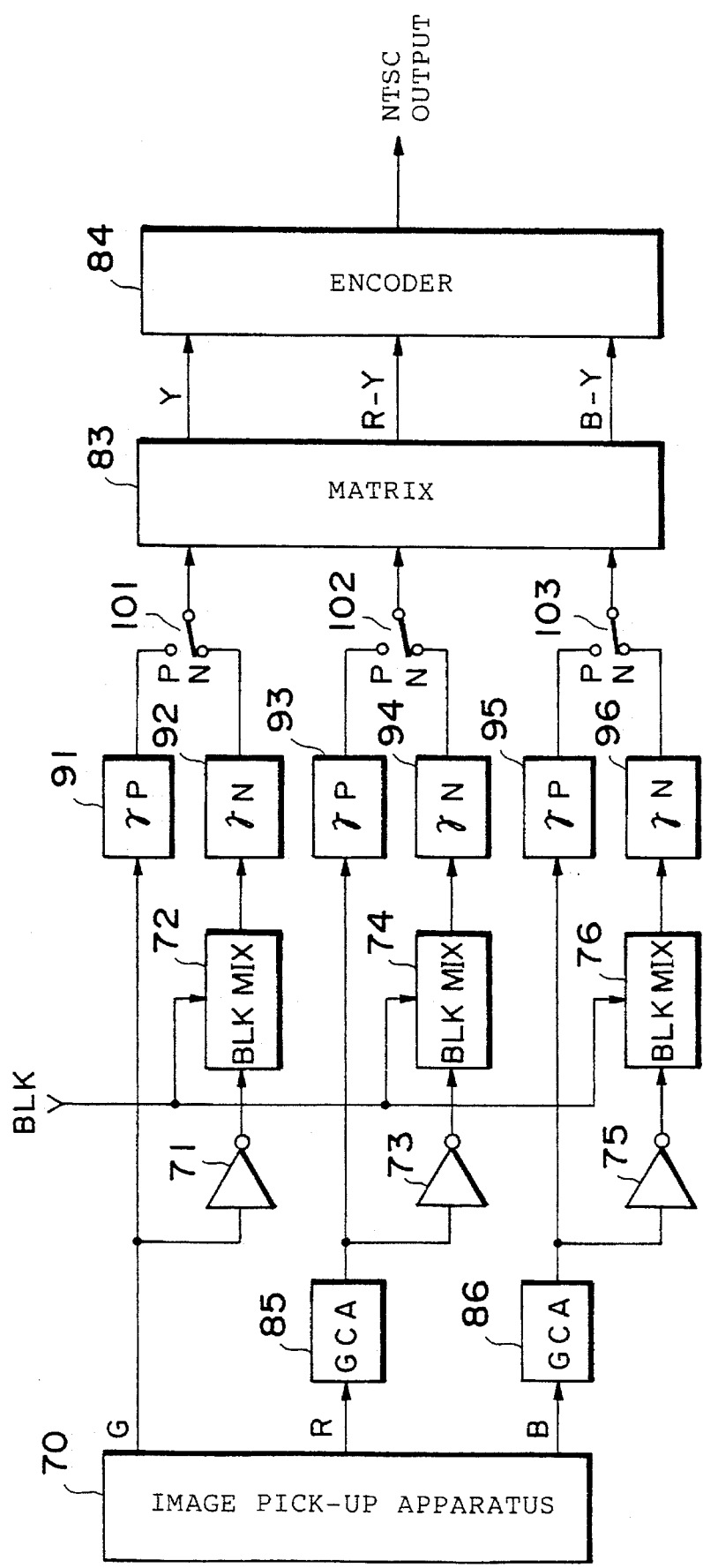
FIG. 13 is a block diagram showing a negative-image signal processing circuit according to the prior art.
Figure 14:
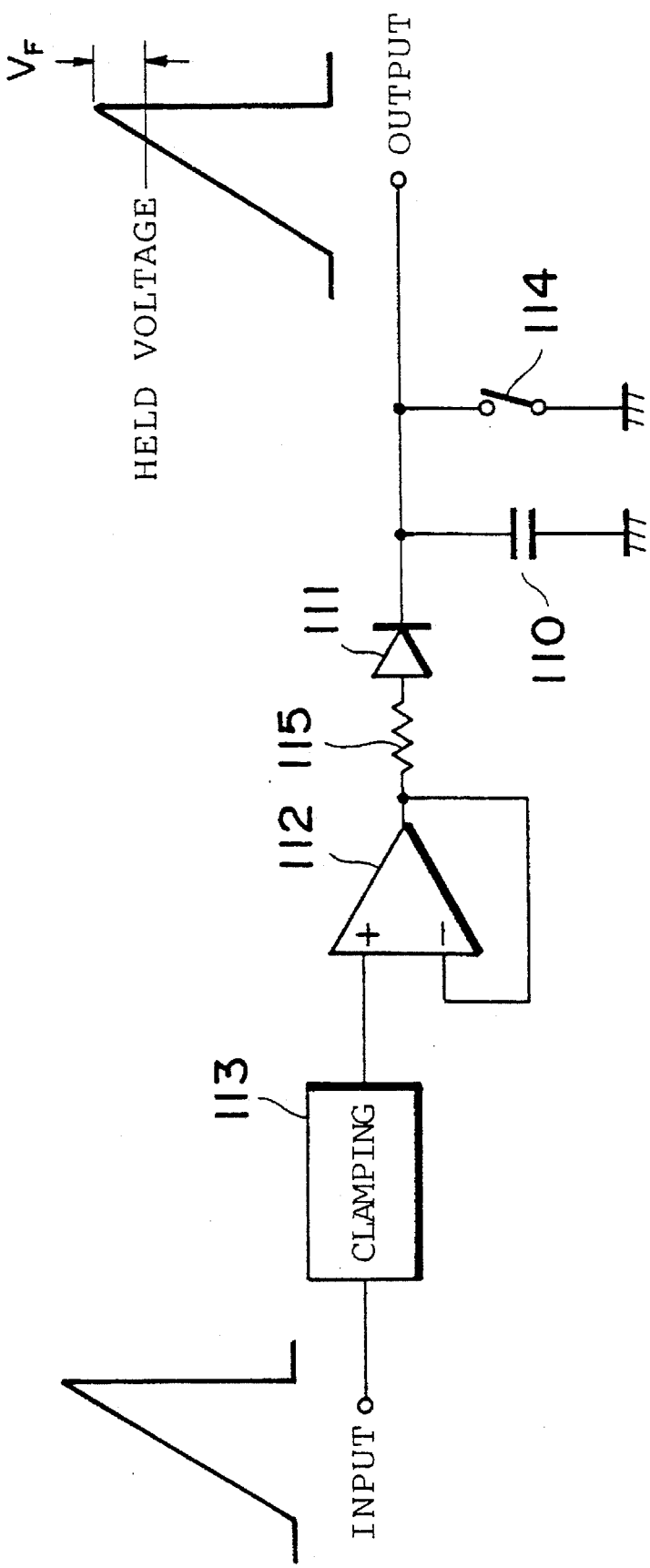
FIG. 14 is a circuit diagram showing a peak detector circuit according to the prior art.

As mentioned earlier, a new system, which is referred to as an electronic overhead projector, has been developed as a replacement for the optical overhead projector. According to this system, a subject such as a document or film is imaged by a camera equipped with a solid-state electronic imaging device such as a CCD, and the image of the subject is displayed on a large-size display screen or projected upon a screen. This system has several characterizing features. One is that the system handles negative images such as negative films. A problem encountered is that the tone characteristics of the three primary-color signals R, G and B obtained by picking up a negative image differ from one another, as illustrated in FIG. 12. In order to make the tone characteristics of the three color signals R, G and B coincide, different gamma corrections suited to the tone characteristics of these color signals must be carried out separately. Another feature is that the subject imaged is often planar, such as a document or film, and the distance from the image pick-up apparatus to the subject is fixed (or adjustable over a fixed range). This means that no problem arises even if the depth of field is small. In other words, it is permissible to fully open the iris.

Figure 9:
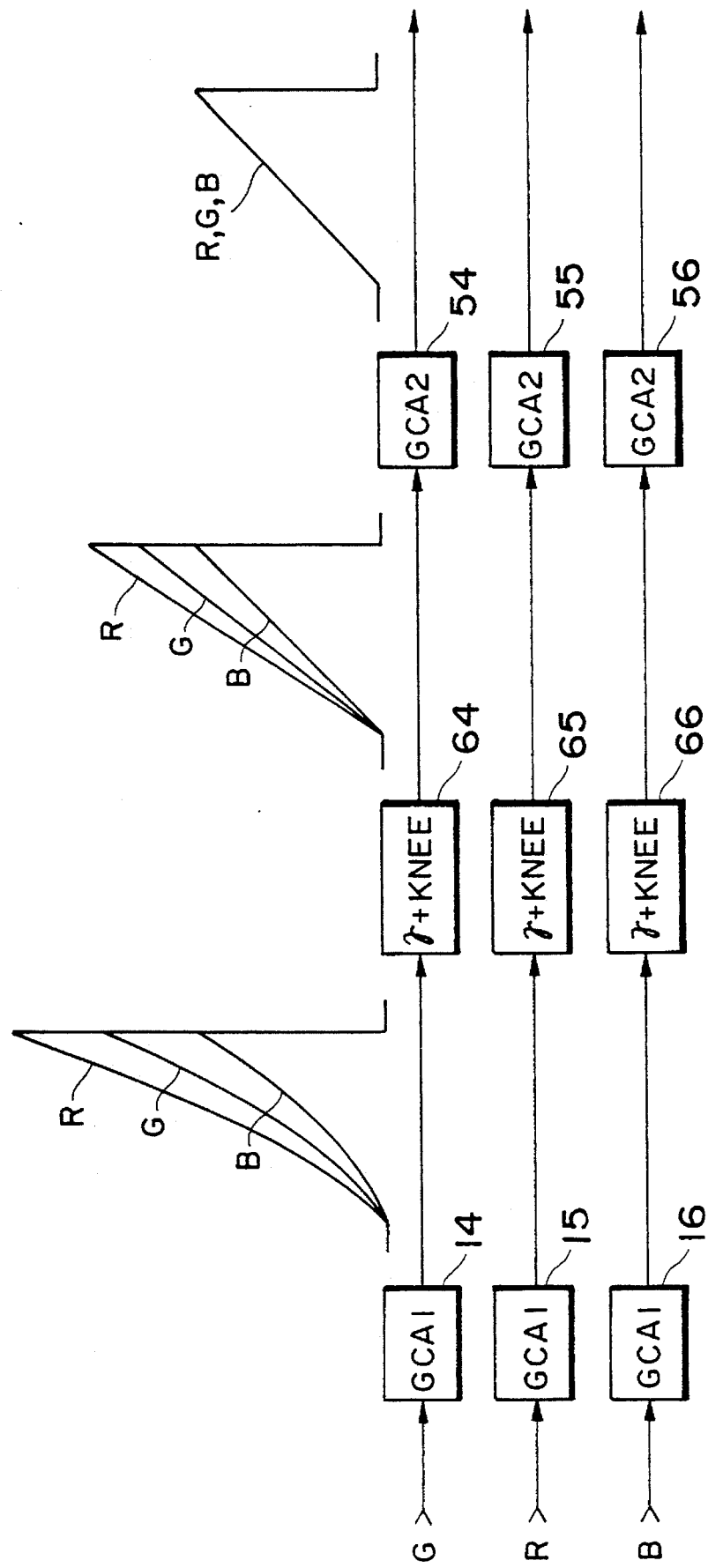
FIG. 9 illustrates the manner in which the tone characteristics of color signals G, R and B are made to coincide by using a variable-gamma correction circuit.

Reference will be had to FIG. 9 to describe an example in which the variable-gamma correction circuit described above in connection with FIGS. 5, 6a and 6b is used in establishing conformity among the tone characteristics of the color signals G, R and B obtained by imaging a negative film. As shown in FIG. 9, variable-gain amplifier circuits 14, 15, 16 on the input side, gamma correction circuits 64, 65, 66 each having a KNEE characteristic, and variable-gain amplifier circuits 54, 55, 56 on the output side are provided for respective ones of the color signals G, R and B. The variable-gain amplifier circuits 14–16 and 54–56 are capable of having their gains adjusted individually. The gamma correction circuits 64–66 all possess the same input/output characteristic, which are shown in FIG. 6a. In FIG. 9, the output-signal waveforms of the variable-gain amplifier circuits 14–16, gamma correction circuits 64–66 and variable-gain amplifier circuits 54–56 are shown at positions corresponding to these circuits.

It is assumed that the color signals G, R and B have been obtained by imaging performed under a proper exposure. In such case, the tone characteristics of the color signals G, R and B will coincide when a single predetermined condition holds if the circuit shown in FIG. 9 is used. For example, on the assumption that 1.5:2:1 is the ratio among the peak-to-peak differences (the differences between the maximum and minimum levels, i.e., the differences between the black and white peak levels) of the color signals G, R and B for a certain negative film before a gamma correction is performed by the gamma correction circuits 64, 65, 66, the tone characteristics of the three color signals G, R and B will be brought into coincidence by revising this ratio to 1:1:1 after the gamma correction.

Specific numerical values will be cited here to facilitate an understanding of the foregoing. Assume that the level differences of the color signals G, R and B (the output signals of the variable-gain amplifier circuits 14, 15, and 16) prior to the gamma correction are G=750 mVpp, R=1000 mVpp and B=500 mVpp. Assume also that the level of a 100% input in the gamma correction circuits 64, 65 and 66 is 500 mVpp. Since the level difference of the color signal B is 500 mVpp, this signal is gamma-corrected solely by an exponential curve; the KNEE curve does not play a part. Since the input of the color signal G possesses a level of 150%, a constriction is applied in the vicinity of the maximum level and the input is corrected by the gamma value that has changed in the manner indicated by the solid line in FIG. 6b. Since the color signal R has an input level of 200%, it is corrected by a gamma value which has undergone an even greater change, and therefore a much greater constriction is applied in the vicinity of the maximum level. The gains of the variable-gain amplifier circuits 54, 55 and 56 are adjusted in such a manner that coincidence is finally established among the level differences of the color signals G, R and B thus subjected to gamma corrections that differ from one another.

It should be noted that one of the variable-gain amplifier circuits 14–16 is not necessarily required, and the same is true also for the variable-gain amplifier circuits 54–56.

It is possible to correct a lack of uniformity among tone characteristics of the kind described above if the negative film, which is the subject undergoing imaging, has been properly exposed. If the negative film has not been properly exposed, a transition is made to an area where the tone characteristic curves shown in FIG. 12 become extremely gentle and phenomena referred to as black crushing and white stretching occur. When this happens, applying a gamma correction is futile. In particular, when imaging a negative film, the proper exposure range is narrow and it is necessary to perform a very fine adjustment of exposure.

Accordingly, a further object of the present invention is to perform a proper exposure adjustment and carry out a gamma correction appropriately in an image pick-up apparatus which uses a variable-gamma correction circuit, as shown in FIG. 5 or FIG. 9, to perform gamma corrections individually in such a manner that conformity is eventually established among the tone characteristics of three color signals.

Figure 10:
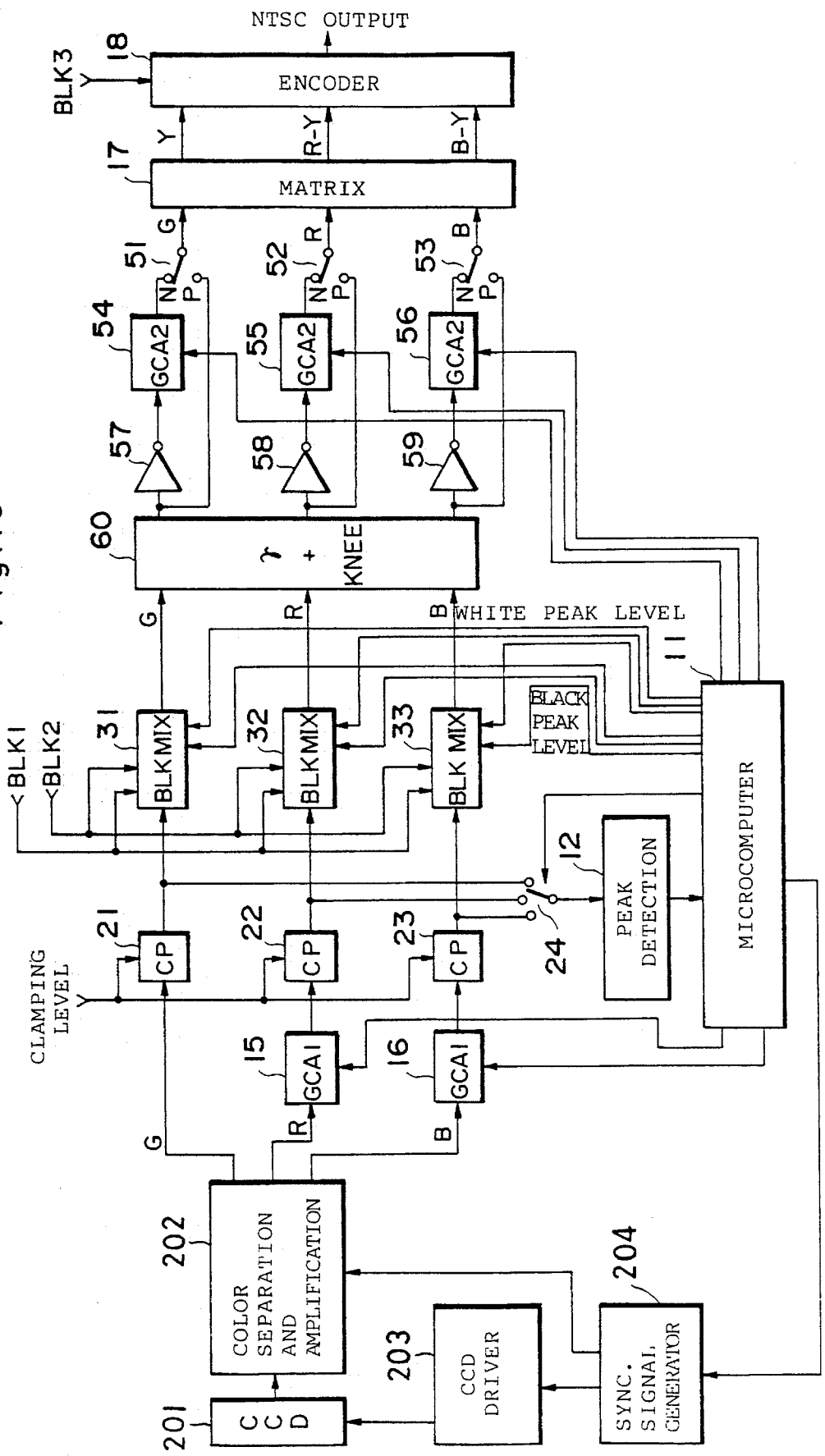
FIG. 10 is a block diagram illustrating the electrical construction of an embodiment of an electronic image pick-up apparatus having an electronic shutter function according to the present invention.
Figure 11:
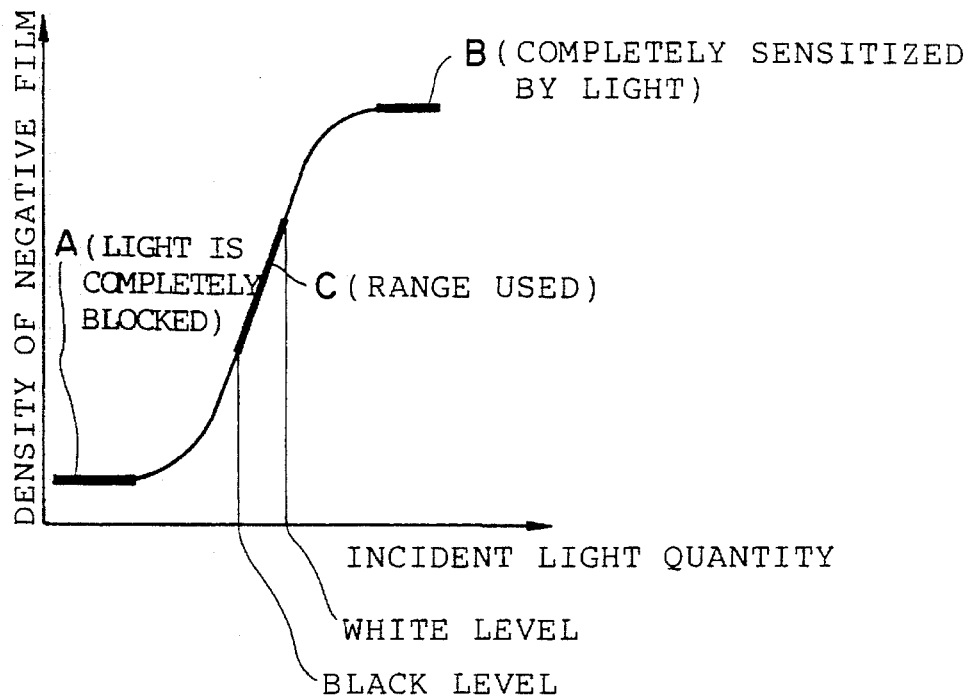
FIG. 11 is a graph showing the tone characteristic of an image which appears on a negative film.

FIG. 10 is a block diagram showing the electrical construction of an embodiment of an electronic image pick-up apparatus having an electronic shutter function according to the present invention. The arrangement of FIG. 10 uses the variable-gain amplifier circuits 15, 16 and the variable-gain amplifier circuits 54–56 shown in FIG. 9. The variable-gain amplifier circuit 14 for the color signal G has been omitted. In addition, the gamma correction circuits 64–66 are shown collectively as a single block, namely a gamma correction circuit 60, which essentially performs the same functions.

Furthermore, in this electronic image pick-up apparatus, use is made of an image signal processing circuit whose structure is almost the same as that of the image signal processing circuit shown in FIG. 7. Accordingly, portions in FIG. 10 that are the same as those shown in FIG. 7 are designated by like reference characters, and redundant explanations will be avoided as much as possible. In addition, the waveform diagrams of FIGS. 8a through 8h are applied to this embodiment also without change.

As shown in FIG. 10, the apparatus is provided with a CCD 201 for imaging a subject such as a negative film, a driver circuit 203 for the CCD 201, and a synchronizing signal generator circuit 204. The latter produces horizontal and vertical synchronizing signals based upon a reference clock signal. Further, based upon the reference clock signal, the synchronizing signal generator circuit 204 produces and outputs horizontal drive pulses (a pixel clock) and vertical drive pulses for reading a signal charge out of the CCD 201, a transfer-start (read-start) pulse synchronized to the above-mentioned synchronizing signals, and a clearing pulse for controlling storage time. The CCD driver circuit 203 clears tile CCD 201 and reads the signal charge from the CCD 201 based upon the various aforementioned signals and pulses provided by the synchronizing signal generator circuit 204. The control of an exposure time by an electronic shutter is performed in accordance with the output timing of the clearing pulse. More specifically, the signal charge which has accumulated in the CCD 201 is cleared (as by a reverse transfer, forward transfer or sweep-out to the substrate) by the clearing pulse, after which a signal charge representing the image of the subject starts to be accumulated on the CCD 201. The time from the clearing pulse to generation of the next pulse for start of transfer (start of read-out) is the exposure time. The read-out of the signal charge from the CCD 201 is performed repeatedly at a predetermined period (e.g., 1/60 sec).

The signal read out of the CCD 201 is applied to a color separation and amplification circuit 202 which performs color separation and amplification. The color separation and amplification circuit 202 outputs the three primary-color signals G, R and B representing the image of the subject. The color signals G, R and B are as illustrated in FIG. 8a. As illustrated, the color signals G, R, B reflect the differences in the tone characteristics of the colors, as described earlier. Also, the levels of the DC signal components generally differ from one another.

The color signal G from among these color signals is applied directly to the clamping circuit 21, and the other color signals R and B are applied to the respective clamping circuits 22, 23 upon first being amplified at an appropriate gain by the variable-gain amplifier circuits 15 and 16, respectively. The DC signal components of the color signals G, R and B are made to conform by the clamping circuits 21, 22 and 23.

The color signals G, R and B outputted by the respective clamping circuits 21, 22 and 23 are applied to the respective blanking mixer circuits 31, 32 and 33 and also to the changeover switch (multiplexer) 24. The changeover switch 24 is changed over at a fixed time interval by a microcomputer 11 so that the color signals G, R and B are successively applied to the peak detector circuit 12. The latter detects the maximum and minimum levels of the input signal in the manner described earlier.

The black and white peak levels of each of the color signals G, R and B detected by the peak detector circuit 12 are applied to the microcomputer 11. The latter uses the data representing the inputted black and white peak levels to control the shutter speed of the electronic shutter and the gains of the variable-gain amplifier circuits 15, 16.

In this embodiment, the color signal G is used as a reference and the shutter speed is controlled based upon the difference between the black peak level and white peak level of the color signal G. For example, shutter speed is decided in such a manner that the difference between the black peak level and white peak level of the color signal G becomes 750 mVpp, and the synchronizing signal generator circuit 204 is controlled by the microcomputer 11 in such a manner that the above-mentioned clearing signal is generated at the timing of the decided shutter speed. If the shutter speed is high, the difference between the black peak level and white peak level of the color signal G is small because of the short exposure time of the CCD 201. If the shutter speed is low, the aforementioned level difference is large. While changing the shutter speed, the microcomputer 11 measures the difference between the black peak level and white peak level of the color signal G for each and every shutter speed and finds a shutter speed that will cause the level difference to become 750 mVpp.

Alternatively, since the shutter speed and level differences are inversely proportional, the shutter speed that will cause the level difference to become 750 mVpp can be found through calculation by performing imaging once at a suitable shutter speed, detecting the level difference prevailing at this time and using the detecting level difference and the shutter speed to perform the calculation. It goes without saying that the target level difference of the color signal G is not limited to 750 mVpp; it will suffice if the value is within a range corresponding to the proper exposure range. In either case, the shutter speed which will give the appropriate exposure is decided in the manner described, and imaging of the subject is performed at this shutter speed.

In order to bring the tone characteristics of the color signals G, R and B into conformity in the manner described above, a suitable ratio among the level differences of the color signals G, R and B inputted to the gamma correction circuit 60 is decided in dependence upon the subject (the negative film). When the difference between the black and white peak levels of the color signal G is 750 mVpp, proper differences between the black and white peak levels of the color signals R and B are 1000 mVpp and 500 mVpp, by way of example. The microcomputer 11 adjusts the gains of the variable-gain amplifier circuits 15 and 16 in such a manner that the Level differences of the color signals R and B attain the values of 1000 mVpp and 500 mVpp, respectively. The color signals G, R and B, after thus being shutter-speed controlled in order to obtain the proper exposure, adjusted so as to possess level differences suited to a gamma correction, and having their DC components clamped, are as shown in FIG. 8b. The levels of the DC components of the three color signals G, R, B conform. The black or white peaks of the three color signals G, R and B, and the disparity among the tone characteristics of the color signals G, R and B, have not yet been adjusted. Even though the white peaks are drawn so as to coincide with one another for the color signals G, R and B in FIG. 8b, this is done in order to simplify the drawing.

The color signals G, R and B thus adjusted in level are respectively applied to the blanking mixer circuits 31, 32 and 33, as described earlier. The two types of blanking-timing signals BLK1, BLK2 are inputted to each of the blanking mixer circuits 31, 32 and 33, as set forth earlier. The microcomputer 11 supplies each of the blanking mixer circuits 31, 32 and 33 with signals representing the black peak levels and white peak levels, which have been level-adjusted as described above, of the color signals G, R and B. The blanking mixer circuits 31, 32 and 33 superimpose pulse signals representing the white peak levels on the color signals G, R and B during the time that the blanking-timing signal BLK1 is at the H level, and superimpose pulse signals representing the corresponding black peak levels on the color signals G, R and B during the time that the blanking-timing signal BLK2 is at the H level.

The color signals G, R and B obtained by thus applying the pulse signals representing the white and black peak levels in the blanking intervals are illustrated, along with the blanking-timing signals BLK1, BLK2, in FIG. 8c. The white and black peak levels are preserved in the blanking intervals of the color signals G, R and B.

The output signals of the blanking mixer circuits 31, 32 and 33 are applied to the gamma correction circuit 60 having the KNEE characteristic. The gamma correction circuit 60 includes the gamma correction circuits 64, 65, 66 described earlier. The color signals G, R and B inputted to the gamma correction circuit 60 are outputted upon being gamma-corrected, in dependence upon their input magnitudes, by the input/output characteristic curve a portion of which is the KNEE curve. The height (amplitude) of the pulse signal representing the black peak level applied in the blanking interval also is gamma-corrected in the same manner. The output signal of the gamma correction circuit 60 is as shown in FIG. 8d.

The output signals G, R and B from the gamma correction circuit 60 are inverted from negative to positive by the inverter circuits 57, 58 and 59, respectively (the signals after inversion are as shown in FIG. 8e). The output signals G, R and B from the gamma correction circuit 60 are also to the positive terminals P of the changeover switches 51, 52, 53, respectively.

The color signals R, G and B inverted by the inverter circuits 57, 58 and 59 are applied to variable-gain amplifier circuits 54, 55 and 56, respectively. As shown in FIG. 8f, the gains of the variable-gain amplifier circuits 54, 55, 56 are adjusted in such a manner that the differences between the black and white peak levels coincide in the output signals G, R and B of the respective amplifier circuits 54, 55 and 56. Since the level differences in the color signals G, R and B inputted to the gamma correction circuit 60 are known, the gains of the amplifier circuits 54, 55 and 56 necessary in order that these level differences may be made to conform can be obtained by calculation. Accordingly, it is unnecessary to detect the black and white peak levels of the output signals from the amplifier circuits 54, 55 and 56.

Thus, the tone characteristics of the three primary-color signals G, R and B are made to coincide, and so are the differences between the black peak levels and white peak levels. The color signals G, R and B are applied to the negative input terminals N of the changeover switches 51, 52 and 53, respectively. If necessary, the black peak levels or white peak levels in the three color signals G, R and B are made to conform by a clamping processing or the like in the encoder 18, etc., as will be described later. As a result, white balance is perfectly adjusted. The output color signals G, R and B of the changeover switches 51, 52 and 53 are applied to the matrix circuit 17, which converts them into a luminance signal Y and color-difference signals R-Y and B-Y. These signals Y, R-Y and B-Y are converted into an NTSC-format video signal by the encoder 18, which delivers the video signal as an output signal.

The blanking-timing signal BLK3 is applied to the encoder 18. Blanking is performed in the L-level interval of the timing signal BLK3 in such a manner that the signals Y, R-Y and B-Y coincide with the respective signal levels (i.e., the black levels) in the H-level interval of the timing signal BLK2. As a result, a signal component representing the blanking interval of the NTSC format is applied to the signals Y, R-Y and B-Y. The NTSC signal finally obtained is illustrated in FIG. 8h.

As many apparently widely different embodiments of the present invention can be made without departing from the spirit and scope thereof, it is to be understood that the invention is not limited to the specific embodiments thereof except as defined in the appended claims.

What is claimed is:

1. A negative-image signal processing circuit for use in an image processing apparatus comprising:

a peak detector circuit for detecting a maximum level and a minimum level of each of three types of color signals obtained by picking up a negative image; and an adjusting circuit for adjusting amplitudes and the maximum or minimum levels of the three types of color signals in such a manner that the detected maximum levels become equal to one another in the three types of color signals and the detected minimum levels become equal to one another in the three types of color signals, said adjusting circuit including, variable-gain amplifier circuits for adjusting the amplitudes of at least two types of the color signals in such a manner that the differences between detected maximum levels and minimum levels become equal to one another in the three types of color signals, and level adjusting circuits for adjusting the levels of the three types of color signals so that the three types of color signals attain a level at which the maximum levels or minimum levels become equal to one another.

2. The processing circuit for use in an image processing apparatus according to claim 1, further comprising gamma correction circuits for bringing tone characteristics of the the three types of color signals into conformity, said gamma correction circuits being equipped with said level adjusting circuit.

3. The processing circuit for use in an image processing apparatus according to claim 1, further comprising blanking mixer circuits for superimposing signal components representing the detected maximum level and minimum levels on first- and second-half portions, respectively, of blanking intervals of the three types of color signals adjusted in such a manner that differences between the maximum levels and minimum levels become equal to one another.

4. The processing circuit for use in an image processing apparatus according to claim 1, further comprising clamping circuits for bringing DC component levels of the three types of color signals into conformity, said clamping circuits being provided for respective ones of the three types of color signals and being arranged in front of said peak detector circuit.

5. The processing circuit for use in an image processing apparatus according to claim 1, wherein said peak detector circuit comprises:

a holding capacitor for holding a peak voltage;

a current source for charging said holding capacitor; and a comparator for comparing an input voltage and the voltage held by said holding capacitor, and executing control in dependence upon whether a peak to be detected is a maximum value or a minimum value in such a manner that if the held voltage fails to attain the input voltage, said current source is activated to charge said holding capacitor.

6. The process circuit for use in an image processing apparatus according to claim 5, wherein a first peak detector circuit is provided for detecting the maximum level and a second peak detector circuit is provided for detecting the minimum level; and further comprising an input circuit for applying the input voltage directly to said first peak detector circuit for detecting the maximum level and for providing said second peak detector circuit for detecting the minimum level with a voltage obtained by subtracting the input voltage from a predetermined reference voltage.

7. A method for negative-image signal processing in an image processing apparatus, comprising the steps (a) detecting a maximum level and a minimum level of each of three types of color signals obtained by picking up a negative image; and (b) adjusting amplitudes and the maximum or minimum levels of the three types of color signals in such a manner that the detected maximum levels become equal to one another in the three types of color signals and the detected minimum levels become equal to one another in the three types of color signals;

wherein said step (b) further includes the steps of:

(b) (1) adjusting the amplitudes of at least two types of the color signals in such a manner that the differences between detected maximum levels and minimum levels become equal to one another in the three types of color signals; and (b) (2) adjusting the levels of the three types of color signals so that the three types of color signals attain a level at which the maximum levels or minimum levels become equal to one another.

8. The method according to claim 7, further comprising the step of bringing tone characteristics of the three types of color signals into conformity.

9. The method according to claim 7, further comprising the step of superimposing signal components representing the detected maximum level and minimum levels of first- and second-half portions, respectively, of blanking intervals of the three types of color signals adjusted in such a manner that differences between the maximum levels and minimum levels become equal to one another.

10. The method according to claim 7, further comprising the step of bringing DC component levels of the three types of color signals into conformity by clamping circuits provided for respective ones of the three types of color signals.

* * * * *